(12) United States Patent
Lu

(10) Patent No.: US 12,517,714 B2
(45) Date of Patent: Jan. 6, 2026

(54) IMPLEMENTATION METHOD AND APPARATUS FOR APPLICATION INSTALLATION ON SMART POINT OF SALE DEVICE

(71) Applicant: Feitian Technologies Co., Ltd., Beijing (CN)

(72) Inventor: Zhou Lu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 238 days.

(21) Appl. No.: 18/291,579

(22) PCT Filed: Oct. 14, 2022

(86) PCT No.: PCT/CN2022/125484
§ 371 (c)(1),
(2) Date: Jan. 24, 2024

(87) PCT Pub. No.: WO2023/124401
PCT Pub. Date: Jul. 6, 2023

(65) Prior Publication Data
US 2024/0370246 A1 Nov. 7, 2024

(30) Foreign Application Priority Data
Dec. 31, 2021 (CN) .......................... 202111677503.9

(51) Int. Cl.
*G06F 9/44* (2018.01)
*G06F 8/61* (2018.01)
(Continued)

(52) U.S. Cl.
CPC ................. *G06F 8/61* (2013.01); *G06F 8/65* (2013.01); *G06F 11/0766* (2013.01); *G06F 11/1433* (2013.01); *G06Q 20/20* (2013.01)

(58) Field of Classification Search
CPC ........... G06F 8/61; G06F 8/65; G06F 11/0766
See application file for complete search history.

(56) References Cited

U.S. PATENT DOCUMENTS 9,628,950 B1 * 4/2017 Noeth ............... H04M 1/72457
10,007,501 B1 6/2018 Zhang et al.
(Continued)

FOREIGN PATENT DOCUMENTS

| CN | 106155727 | 11/2016 |
| CN | 106778213 | 5/2017 |

(Continued)

OTHER PUBLICATIONS

"International Search Report (Form PCT/ISA/210) of PCT/CN2022/125484", mailed on Dec. 27, 2022, with English translation thereof, pp. 1-6.

(Continued)

*Primary Examiner* — Hang Pan
(74) *Attorney, Agent, or Firm* — JCIPRNET

(57) ABSTRACT

The present disclosure discloses are an implementation method and apparatus for an application installation on a smart Point of Sale device. The method includes: starting, by an application providing a system interface, an installation service for the mobile management application when judging that a mobile management application update package path received in a broadcast is not empty. According to the saved mobile management application update package, it starts to silently install a new version of the mobile management application. If the installation is successful, the mobile management application update package is changed to the mobile management application successful update file, and the new version of the mobile management application is started. If the installation fails, the mobile management application update package is changed to the (Continued)

mobile management application update failure file, and the old version of the mobile management application is started.

20 Claims, 8 Drawing Sheets

(51) Int. Cl.
*G06F 8/65* (2018.01)
*G06F 11/07* (2006.01)
*G06F 11/14* (2006.01)
*G06Q 20/20* (2012.01)

(56) References Cited

U.S. PATENT DOCUMENTS

| | | | | |
|---|---|---|---|---|
| 10,146,520 | B1* | 12/2018 | Hillyard | G06F 8/65 |
| 2006/0039564 | A1 | 2/2006 | Rao | |
| 2010/0161506 | A1* | 6/2010 | Bosenick | G06Q 30/02 |
| | | | | 705/347 |
| 2011/0107300 | A1* | 5/2011 | Vidal | G06F 8/65 |
| | | | | 717/121 |
| 2012/0284706 | A1* | 11/2012 | Cui | H04W 4/50 |
| | | | | 717/178 |
| 2014/0282486 | A1* | 9/2014 | Hisamoto | G06F 8/65 |
| | | | | 717/172 |

FOREIGN PATENT DOCUMENTS

| | | |
|---|---|---|
| CN | 110515642 | 11/2019 |
| CN | 111049879 | 4/2020 |
| CN | 111078252 | 4/2020 |
| CN | 112667258 | 4/2021 |
| CN | 114327519 | 4/2022 |

OTHER PUBLICATIONS

"Written Opinion of the International Searching Authority (Form PCT/ISA/237) of PCT/CN2022/125484", mailed on Dec. 27, 2022, with English translation thereof, pp. 1-8.

Da Vinci Went Home, "Android 9.0 Silent Installation Implementation", with English translation thereof, Sep. 26, 2021, pp. 1-15, Available at: https://juejin.cn/post/7012268829799612446.

Smart0928, "Silent installation and self-starting of the Android app", with English translation thereof, Mar. 24, 2021, pp. 1-8, Available at: https://www.jianshu.com/p/9f0deecf6e72.

Office Action of China Counterpart Application, with English translation thereof, issued on Mar. 4, 2025, pp. 1-37.

* cited by examiner

IMPLEMENTATION METHOD AND APPARATUS FOR APPLICATION INSTALLATION ON SMART POINT OF SALE DEVICE

CROSS-REFERENCE TO RELATED APPLICATIONS

This application is a 371 of international application of PCT application serial no. PCT/CN2022/125484, filed on Oct. 14, 2022, which claims priority to Chinese patent application No. 202111677503.9, filed to the China National Intellectual Property Administration on Dec. 31, 2021. Both of the aforementioned applications are hereby incorporated by reference in their entireties.

TECHNICAL FIELD

Embodiments of the present disclosure relate to the field of smart terminal devices and, in particular, to an implementation method and apparatus for an application installation on a smart Point of Sale (POS) device.

BACKGROUND

Existing smart POS devices do not have a pre-installed application market by default, and generally download applications through using a mobile management application (the mobile management application refers to a mobile agent of remote operations and managements of a smart terminal, set up on a smart POS machine) in conjunction with a backend server (referring to a remote operation and management system of the smart terminal). The mobile management application can maintain the smart POS device and system applications within the device, and can also push other applications in a background through using the backend server, that is, the mobile management application can download and install other applications, and it is convenient and fast to push and manage other applications in the background by means of the mobile management application. Due to an update requirement of the mobile management application, a relevant service and process of the mobile management application will be stopped when the mobile management application is being installed and updated, the relevant service and process of the mobile management application cannot be started after the update, and the relevant service and process of the mobile management application will take effect usually after requiring a user to restart the smart POS device. A user intervention is required to complete a startup of the relevant service and process of the mobile management application, and during this period, controlling for the smart POS device is lost, and the smart POS device is unable to be managed.

SUMMARY

Purposes of the present disclosure is to overcome shortcomings of existing technologies and provide an implementation method and apparatus for an application installation on a smart POS device.

In a first aspect, an embodiment of the present disclosure provides the implementation method for an application installation on a smart POS device, including:

step S1: judging, by an application providing a system interface, whether a mobile management application update package path in a broadcast for updating a mobile management application is empty when receiving the broadcast; if the mobile management application update package path is not empty, executing step S2;

step S2: starting, by the application providing the system interface, an installation service for the mobile management application, silently installing a new version of the mobile management application based on a saved mobile management application update package, and judging whether the new version of the mobile management application has been successfully installed, if so, executing step S3; otherwise, executing step S4; where when the new version of the mobile management application is silently installed, a running old version of the mobile management application is killed by the Android system (operating system);

step S3: changing, by the application providing the system interface, a mobile management application update package as a successful update file for the mobile management application, and initiating the new version of the mobile management application;

step S4: changing, by the application providing the system interface, the mobile management application update package as a failed update file for the mobile management application, and initiating the old version of the mobile management application;

the silently installing the new version of the mobile management application based on the saved mobile management application update package includes:

step S21: calling, by the application providing the system interface, an encapsulated silent installation interface, and judging whether the mobile management application update package exists based on the mobile management application update package path; if the mobile management application update package exists, executing step S22;

step S22: parsing, by the application providing the system interface, a mobile management application update package name from the mobile management application update package, and judging whether the mobile management application update package name is empty; if the mobile management application update package name is not empty, executing step S23;

step S23: obtaining, by the application providing the system interface, a first object and creating a second object, setting an installation session mode of the second object, and setting a size of the second object to be a size of the mobile management application update package;

step S24: creating, by the application providing the system interface, an installation session for the mobile management application based on the first object and the second object, and obtaining a corresponding installation session identifier;

step S25: judging, by the application providing the system interface, a value of the installation session identifier; and if the value of the installation session identifier is not a first preset value, executing step S26;

step S26: copying, by the application providing the system interface, the mobile management application update package to a specified directory based on the first object, the installation session identifier and the mobile management application update package path, and judging whether the replication is successful; if the replication is successful, executing step S27;

step S27: installing, by the application providing the system interface, the mobile management application based on the first object, the installation session identifier, the mobile management application update package path and a first broadcast receiver; if an error occurs during an installation process, reporting an error and stopping; otherwise, judging whether the new version of the mobile management application has been successfully installed.

In a second aspect, an embodiment of the present disclosure further provides a smart POS device, where the smart POS device includes at least one processor, a memory and instructions stored on the memory and executed by the at least one processor; and the at least one processor executes the instructions to implement the implementation method for an application installation on a smart POS device.

In a third aspect, an embodiment of the present disclosure further provides a computer-readable storage medium, where the computer-readable storage medium includes a computer program which; when running on a smart POS device, enables the smart POS device to execute the implementation method for an application installation on a smart POS device as described above.

Comparing with the related art, the present disclosure has the following advantages:

technical solutions of the present disclosure can use a backend server to push the mobile management application update packages without installing an application market on the smart POS device, and use the application providing the system interface to install and update the mobile management application and restart the mobile management application, an update of the mobile management application can be achieved without restarting the smart POS device, while ensuring the control of the mobile management application over the intelligent POS device, and making it convenient for users to use.

DESCRIPTION OF EMBODIMENTS

The present application proposes an implementation method and apparatus for an application installation on a smart POS device, specific implementations of the present application will be described in detail below in combined with accompanying drawings. Examples of the embodiment are shown in the accompanying drawings. The embodiments described below with reference to the accompanying drawings are exemplary and are only intended to explain the present application and cannot be interpreted as a limitation for the present application.

Those skilled in the art can understand that, unless otherwise defined, all terms used here (including technical and scientific terms) have the same meaning as those of ordinary skill in the art to which the present application belongs. It should also be understood that, the terms such as those defined in general dictionaries should be understood to have meanings consistent with those in context of existing technology, and unless specifically defined as such, they will not be interpreted with idealized or overly formal meanings.

In order to make purposes, technical solutions and advantages of the present disclosure clearer, the following will provide a further detailed description of the implementations of the present disclosure in conjunction with the accompanying drawings.

Embodiment 1

Figure 1:
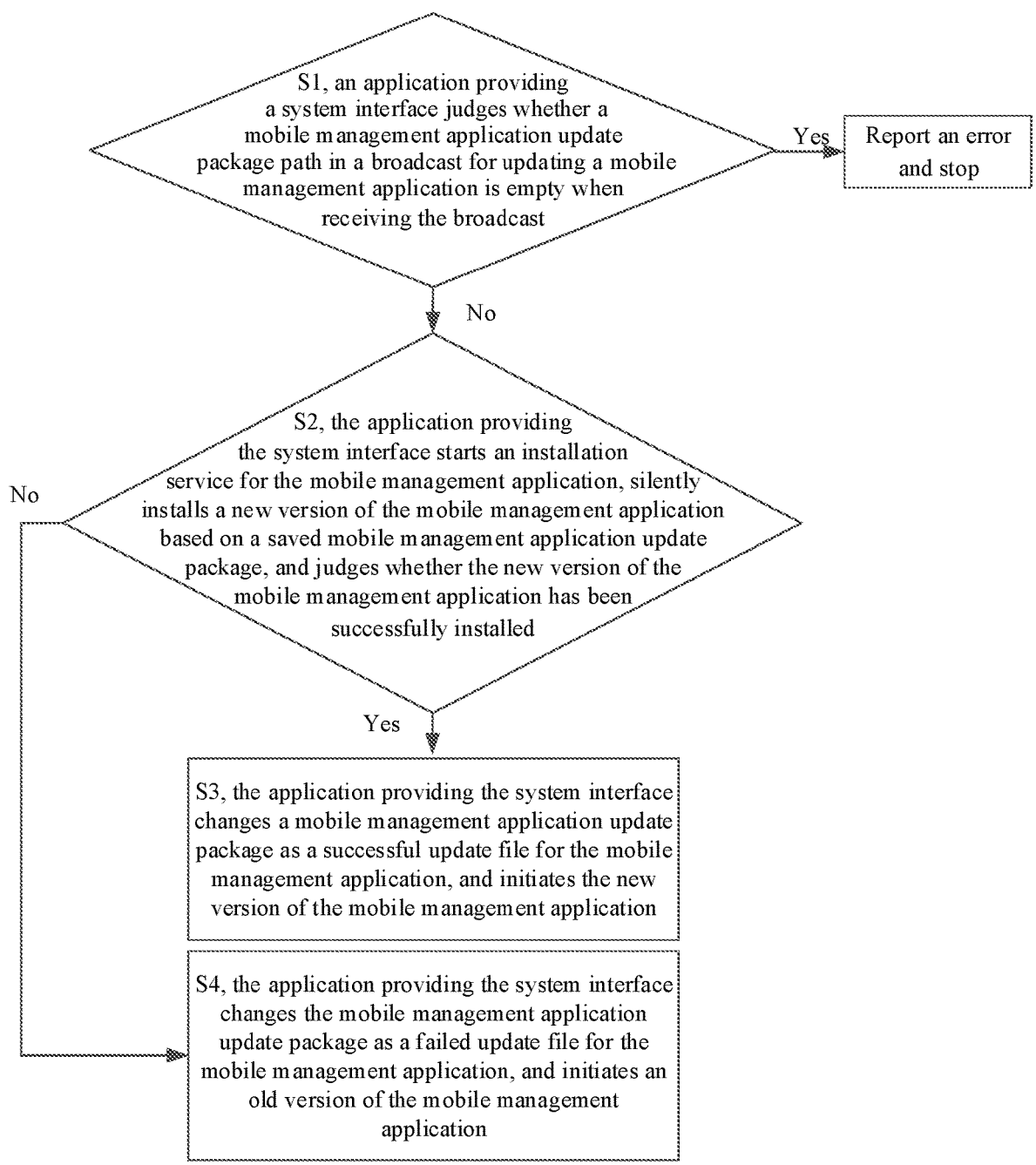
FIG. 1 is a flowchart of an implementation method for an application installation on a smart POS device provided by Embodiment 1 of the present disclosure.
Figures 2A, 2B:
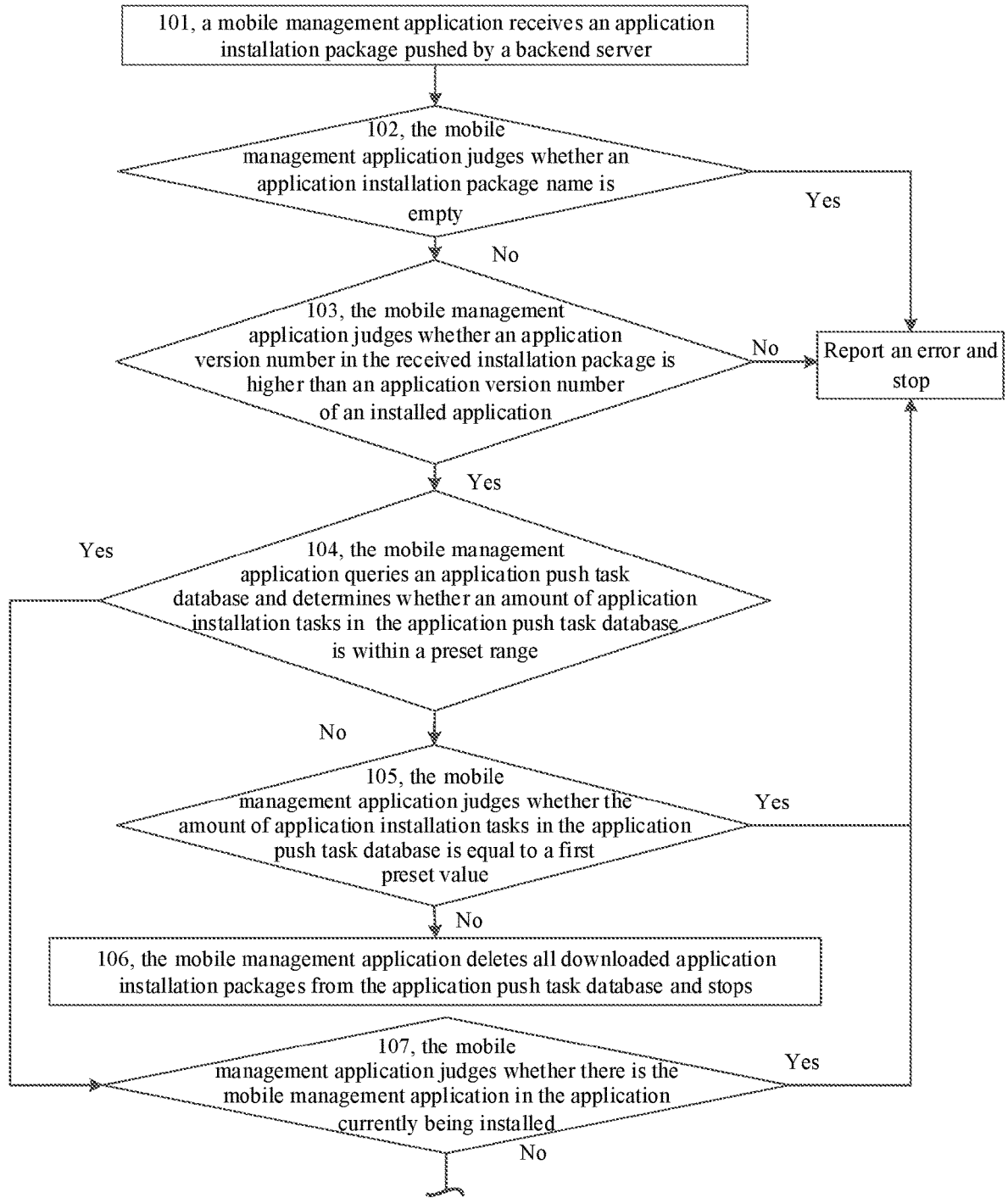
FIGS. 2A, 2B, 3A and 3B are flowcharts of an implementation method for an application installation on a smart POS device provided by Embodiment 2 of the present disclosure.
Figure 2B:
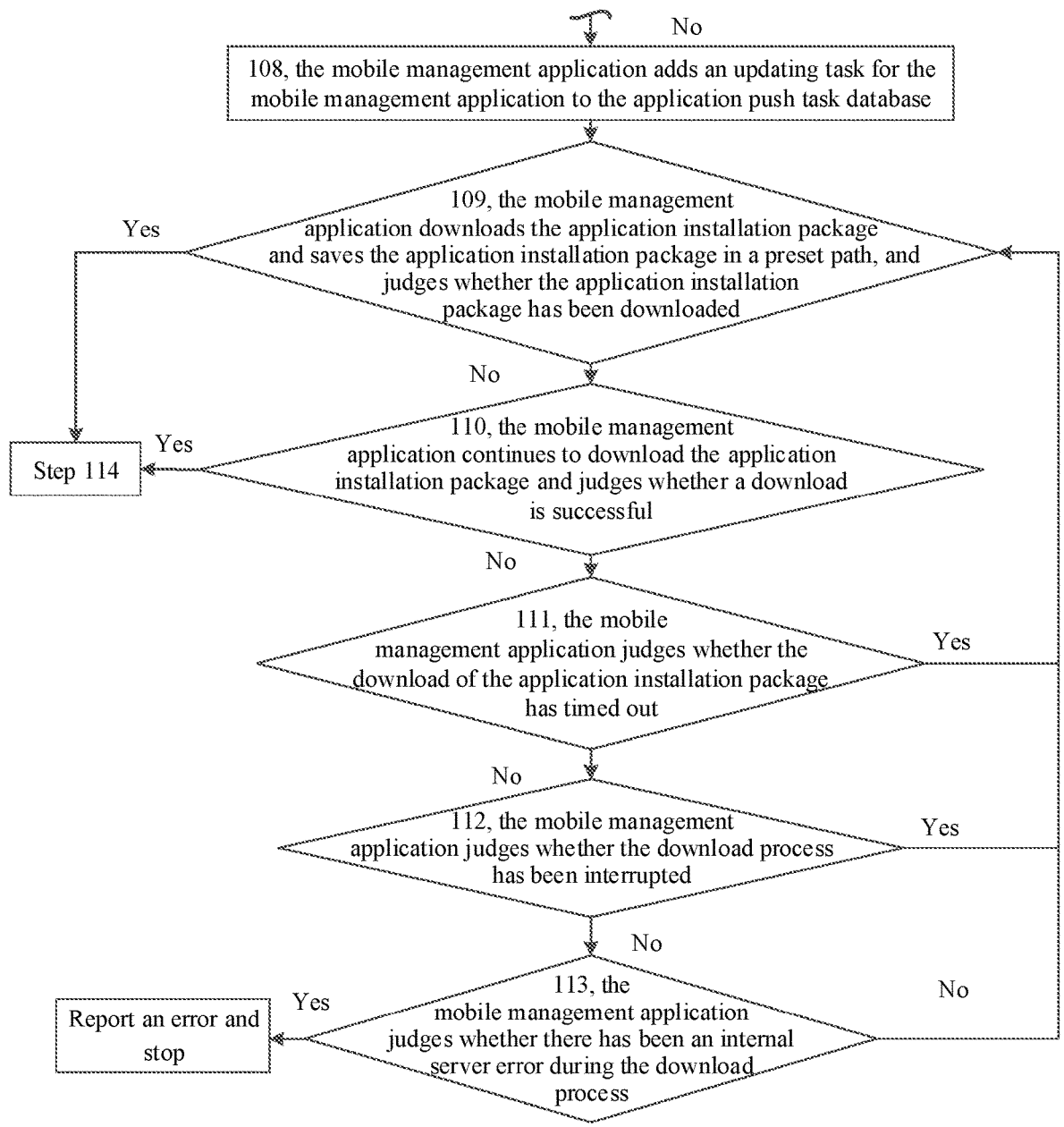
Figure 3A:
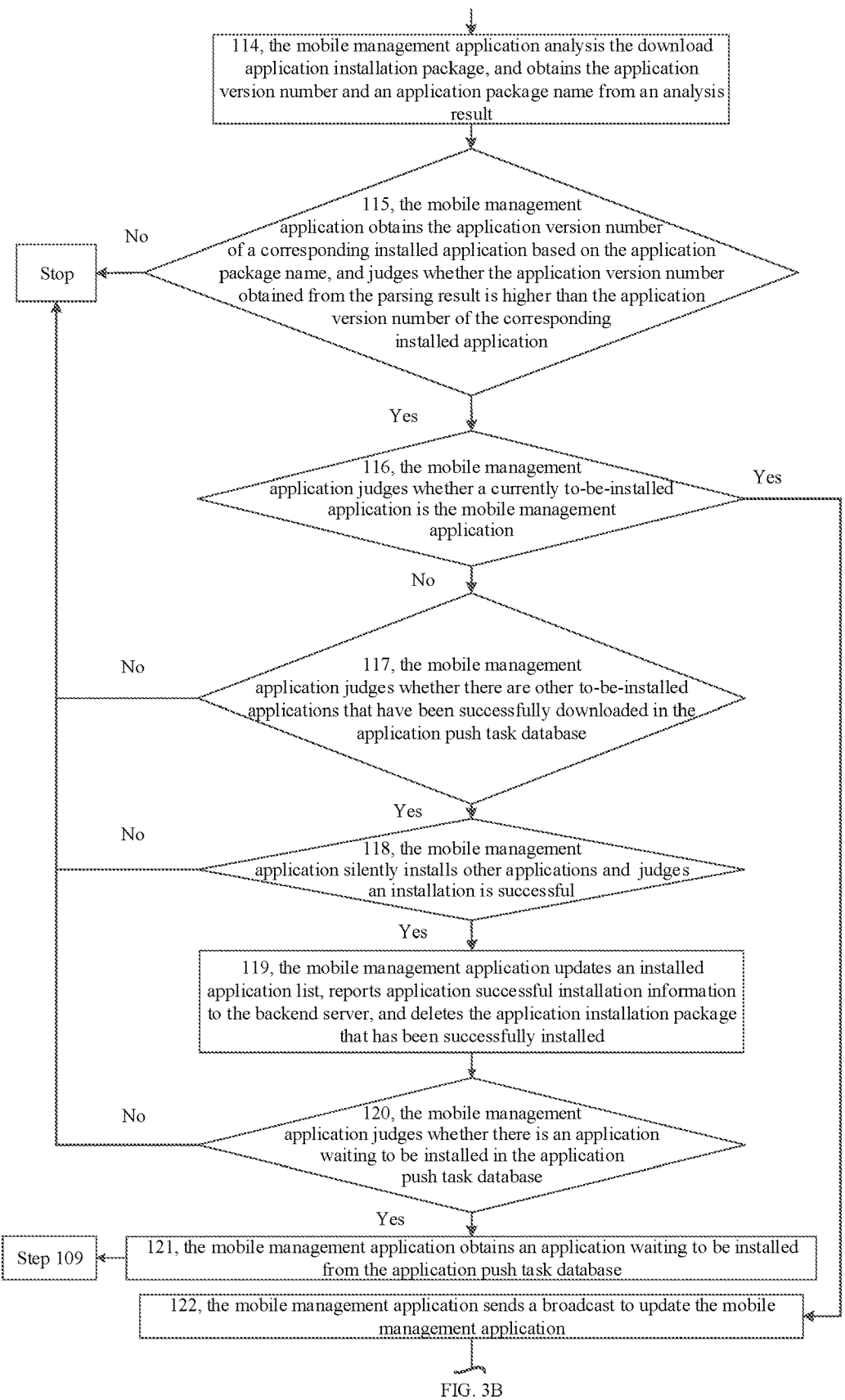
Figure 3B:
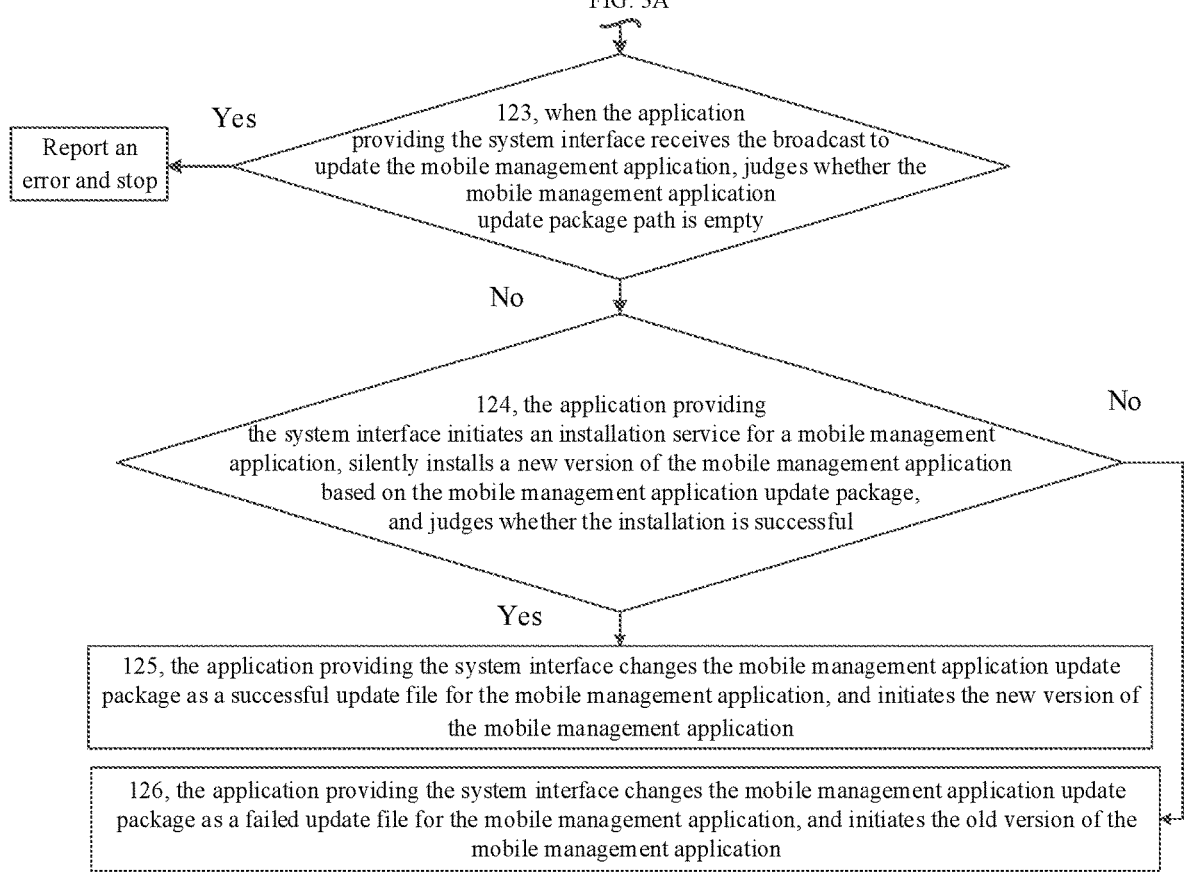

Embodiment 1 of the present disclosure provides an implementation method for an application installation on a smart POS device, as shown in FIG. 1, including the following:

Step S1: an application providing a system interface judges whether a mobile management application update package path in a broadcast for updating a mobile management application is empty when receiving the broadcast; if so, reports an error and stops, if it is not empty, executes step S2.

In an implementation, before the step S1 in this embodiment, the following is further included: step A1: the application providing the system interface registers to listen to a second broadcast receiver of the broadcast for updating the mobile management application; and the second broadcast receiver is used to listen to the broadcast to update the mobile management application sent by the mobile management application.

Specifically, the judging whether the mobile management application update package path in the broadcast is empty includes: obtaining the mobile management application update package path from the received broadcast through an obtaining interface, and judging whether the obtained mobile management application update package path is empty.

Step S2: the application providing the system interface starts an installation service for the mobile management application, silently installs a new version of the mobile management application based on a saved mobile management application update package, and judges whether the new version of the mobile management application has been successfully installed, if so, executes step S3; if no, executes step S4;

where the saved mobile management application update package is specifically saved in the mobile management application update package path obtained in S1.

Specifically, in this embodiment, when the new version of the mobile management application is silently installed, a running old version of the mobile management application will be killed by the Android system.

In an implementation, before silently installing the new version of the mobile management application based on the saved mobile management application update package, the following is further included: declaring an application installation permission in a configuration list file of the application providing the system interface; configuring the first broadcast receiver in the configuration list file; modifying a permission configuration file of the application providing the system interface, and adding the application installation permission to the application providing the system interface.

Where, the first broadcast receiver is used to listen to the broadcast for changes of an installation status of applications; and the installation status is used to identify an installation result of a silent installation of the mobile management applications.

Furthermore, the silently installing the new version of the mobile management application based on the mobile management application update package includes:

step S21: the application providing the system interface calls an encapsulated silent installation interface, and judges whether the mobile management application update package exists based on the mobile management application update package path; if it exists, executes step S22; otherwise, reports an error and stops;

step S22: the application providing the system interface parses a mobile management application update package name from the mobile management application update package, and judges whether the mobile management application update package name is empty; if so, reports an error and stops; if it is not empty, executes step S23;

step S23: the application providing the system interface obtains a first object and creates a second object, sets an installation session mode of the second object, and sets a size of the second object to be a size of the mobile management application update package;

step S24: the application providing the system interface creates an installation session for the mobile management application based on the first object and the second object, and obtains a corresponding installation session identifier;

step S25: the application providing the system interface judges a value of the installation session identifier; and if it is a first preset value, reports an error and stops; otherwise, executes step S26;

step S26: the application providing the system interface copies the mobile management application update package to a specified directory based on the first object, the installation session identifier and the mobile management application update package path, and judges whether the replication is successful; if so, executes step S27; otherwise, reports an error and stops;

step S27: the application providing the system interface installs the mobile management application based on the first object, the installation session identifier, the mobile management application update package path and the first broadcast receiver; if an error occurs during an installation process, reports an error and stops; otherwise, judges whether the new version of the mobile management application has been successfully installed.

In this embodiment, the step S2 further includes: if it is successfully installed, the application providing the system interface sets an installation result as that installation is successful, and issues the broadcast for updating the mobile management application through using the installation result as a parameter; if it fails to install, the application providing the system interface sets the installation result as that installation failed, and issues the broadcast for updating the mobile management application through using the installation result as the parameter; and the first broadcast receiver listens to the broadcast of an application installation status changes issued by a bottom layer of the Android system, retrieves the application installation status from the broadcast, and notifies a callback interface to return the corresponding installation result to the mobile management application based on the application installation status; and the mobile management application saves the received installation result; where the installation result includes successful installation or failed installation.

Step S3: the application providing the system interface changes a mobile management application update package as a successful update file for the mobile management application, and initiates the new version of the mobile management application.

Step S4: the application providing the system interface changes the mobile management application update package as a failed update file for the mobile management application, and initiates an old version of the mobile management application.

Where, in this embodiment, the initiating the new version of the mobile management application and the initiating the old version of the mobile management application include:

step S51: the application providing the system interface starts a main service of the mobile management application through the installation service for the mobile management application that has been started, sets an operation parameter passed in from starting the main service of the mobile management application as updating the mobile management application, and saves an installation result of updating the mobile management application; where the main service of the mobile management application inherits service components of the Android standard.

In an implementation, if the new version of the mobile management application is initiated, the installation result of the mobile management application is updated into successful installation. If the old version of the mobile management application is initiated, the installation result of the mobile management application is updated into failed installation.

Step S52: the mobile management application judges whether a current running process is a main process of the mobile management application; if so, initializes the mobile management application; otherwise, stops;

where, the initializing the mobile management application includes: initializing an application push task database, initializing components used to download files, and initializing a third broadcast receiver; where, the third broadcast receiver is used to listen to the broadcast for network connection changes of a device system, and initialize a push environment when the network is successfully connected;

furthermore, the initializing the third broadcast receiver includes: listening to the broadcast for the network connection changes of the system and initializing the push environment;

furthermore, the initializing the push environment specifically includes: executing an operation of initializing the push environment, starting a backend server and connecting to the backend server when it is detected that a device network is changed; and when the backend server is successfully connected, starting a database connection service, checking status of various push tasks of the mobile management application and reporting to the backend server.

Step S53: the main service of the mobile management application checks whether the operation parameter passed in from starting the main service of the mobile management application is the updating the mobile management application; if so, obtains the saved installation result and judges whether the mobile management application has been successfully updated based on the installation result; if so, executes step S54; otherwise, stops;

step S54: the mobile management application checks whether there is an installation task record for the mobile management application in an application push task database; if so, updates a push status of a mobile management application update task in the application push task database based on the installation result; otherwise, stops.

In this embodiment, after the mobile management application is initiated, the method further includes: the mobile management application performs a self-inspection, where the self-inspection process includes the following.

Step B1: the mobile management application checks the application push task database after being initiated, judges whether an unfinished application push task exists; if so, executes step B2; otherwise, stops.

In this embodiment, before the step B1, the following is further included: the backend server initiates the push task and sends a to-be-pushed list to the mobile management application; and the mobile management application receives the to-be-pushed list and saves the to-be-pushed list in a data table of the application push task database.

Specifically, in step B1 of this embodiment, the judging whether unfinished application push task exists includes: traversing all status words in the data table of the application push task database. If all of the status words are have been pushed, no unfinished application push task exists; otherwise an unfinished application push task exists.

Step B2: the mobile management application judges whether a current installation task is in an end state; if so, executes step B3; otherwise, executes step B4.

Step B3: the mobile management application reports application installation end information to the backend server, deletes an installation record of the mobile management application, deletes the mobile management application update package, and stops.

Step B4: the mobile management application judges whether the current installation task is in a downloading state; if so, continues downloading the application; otherwise, executes step B5.

Step B5: the mobile management application judges whether the current installation task status is being currently installed or has been installed; if so, executes step B6; otherwise, stops.

Step B6: the mobile management application judges whether the current installation task is updating the mobile management application; if so, executes step B7; otherwise, waits for the application to be downloaded.

Step B7: the mobile management application judges whether the successful update file for the mobile management application exists; if so, reports successful update information to the backend server, deletes the mobile management application update package and the update record of the mobile management application in the application push task database, and stops; otherwise, executes step B8.

Step B8: the mobile management application judges whether a failed update file for the mobile management application exists; if so, reports failed update information to the backend server, deletes the mobile management application update package and the update record of the mobile management application in the application push task database, and stops; otherwise, waits for the application to be downloaded.

In this embodiment, the application needs to be downloaded before installing, that is, before step S1, the following is further included.

Step T1: the mobile management application receives an application installation package pushed by the backend server.

Step T2: the mobile management application judges whether a download condition is met; if so, executes step T3; otherwise, reports an error and stops.

Specifically, the step T2 in this embodiment includes:

step T21: the mobile management application judges whether an application installation package name is empty; if so, reports an error and stops; otherwise, executes step T22;

step T22: the mobile management application judges whether an application version number in the application installation package is higher than an application version number of a corresponding application that has been installed; if so, executes step T23; otherwise, reports an error and stops;

step T23: the mobile management application queries the application push task database, and judges whether an amount of application installation tasks in the application push task database is within a preset range; if so, executes step T26; otherwise, executes step T24;

step T24: the mobile management application judges whether the amount of application installation task in the application push task database is equal to the first preset value; if so, reports an error and stops; otherwise, executes step T25;

step T25: the mobile management application deletes all of the application installation packages that have been downloaded in the application push task database, and stops;

step T26: the mobile management application judges whether there is the mobile management application in the applications being currently installed; if so, reports an error and stops; otherwise, executes step T3.

Step T3: the mobile management application adds an application downloading task to an application push task database.

Step T4: The mobile management application starts downloading the application; and if the application is successfully downloaded, executes step T5.

Specifically, in this embodiment, the step T4 includes:

step T41: the mobile management application downloads the application installation package and saves the application installation package in a preset path, judges whether the application installation package has been downloaded; if so, executes step T5; otherwise, executes step T42;

step T42: the mobile management application continues downloading the application installation package and judges whether the application installation package is successfully downloaded; if so, executes step T5; otherwise, executes step T43;

step T43: the mobile management application judges whether there is a timeout when downloading the application installation package; if so, returns to step T41; otherwise, executes step T44;

step T44: the mobile management application judges whether a download process has been interrupted; if so, returns to step T41; otherwise, executes step T45;

step T45: the mobile management application judges whether there is an internal server error during the download process; if so, reports an error and stops; otherwise, returns to step T41.

Step T5: the mobile management application judges whether a currently to-be-installed application that has been successfully downloaded meets an installation condition; if so, executes step T6.

Specifically, the step T5 includes: the mobile management application judges whether an application version number in the application installation package is higher than the application version number of the corresponding application that has been installed; if so, executes step T6, otherwise, stops.

Step T6: the mobile management application judges whether the currently to-be-installed application is the mobile management application; if so, the mobile management application broadcasts and notifies the application providing the system interface to update the mobile management application; otherwise, executes step T7.

Step T7: the mobile management application judges whether there are other to-be-installed applications that have been successfully downloaded in the application push task database; if so, executes step T8; otherwise, stops.

Step T8: the mobile management application silently installs other applications; if the applications are successfully installed, updates an installed application list, reports application successful installation information to the backend server, deletes the application installation package that has been successfully installed, and executes step T9.

Specifically, in the step T8 of this embodiment, the mobile management application silently installs other applications includes:

step T81: the mobile management application calls a silent installation interface and judges whether the application installation package exists based on an installation package path parameter of the silent installation interface; if so, executes step T82; otherwise, reports an error and stops;

step T82: the mobile management application parses the application installation package name from the application installation package and judges whether the application installation package name is empty; if so, reports an error and stops; otherwise, executes step T83;

step T83: the mobile management application obtains the first object and creates the second object, sets the installation session mode of the second object, and sets a size of the second object to a size of the application installation package;

step T84: the mobile management application takes the second object as the parameter, creates an installation session based on the first object, and obtains a corresponding installation session identifier;

step T85: the mobile management application judges a value of the installation session identifier; if the value of the installation session identifier is the first preset value, reports an error and stops; otherwise, executes step T86;

step T86: the mobile management application copies the application installation package to the specified directory based on the first object, the installation session identifier and an installation package path, and judges whether the application installation package has been successfully copied; if so, executes step T87; otherwise, reports an error and stops;

step T87: the mobile management application installs the application based on the first object, the installation session identifier, the installation package path and the first broadcast receiver.

Step T9: the mobile management application judges whether there is an application waiting to be downloaded in the application push task database; if so, obtains the application waiting to be downloaded and returns to step T4; otherwise, stops.

Technical solutions of the present disclosure can use a backend server to push the mobile management application update packages without installing an application market on the smart POS device, and use the application providing the system interface to install and update the mobile management application and restart the mobile management application, an update of the mobile management application can be achieved without restarting the smart POS device, while ensuring the control of the mobile management application over the intelligent POS device, and making it convenient for users to use.

Embodiment 2

Embodiment 2 of the present disclosure provides an implementation method for an application installation on a smart POS device, as shown in FIGS. 2A, 2B, 3A and 3B, the method includes the following.

Step 101: a mobile management application receives an application installation package pushed by a backend server.

In this embodiment, the application installation package is a mobile management application update package or other application installation package.

Step 102: the mobile management application judges whether an application installation package name is empty; if so, reports an error and stops; otherwise, executes step 103.

In this embodiment, when it is judged to be yes in this step, failure information will be reported. For example, the failure information is STATUS_PUSH_FAILED.

Step 103: the mobile management application judges whether an application version number in the received installation package is higher than the application version number of an installed application; if so, executes step 104; otherwise, reports an error and stops.

Specifically, in this embodiment, the step 103 includes the following.

Step 103-1: the mobile management application compares whether the application version number in the received application installation package is lower than the application version number of the installed application; if so, reports an error and stops; otherwise, executes steps 103-2.

In this embodiment, when it is judged to be yes in this step, failure information will be reported. For example, the failure information is STATUS_PUSH_LOWER_VERSION_FAILED.

Steps 103-2: the mobile management application compares whether the application version number in the received application installation package is equal to the version number of the installed application; if so, stops; otherwise, executes step 104.

In this embodiment, when it is judged to be yes in this step, success information will be reported. For example, the success information is STATUS_PUSH_SUCCESS.

Step 104: the mobile management application queries an application push task database and determines whether an amount of application installation tasks in the application push task database is within a preset range; if so, executes step 107; otherwise, executes step 105.

Specifically, the preset range in this embodiment is 0 to 2, including 0 and 2.

Step 105: the mobile management application judges whether the amount of application installation tasks in the application push task database is equal to a first preset value; if so, reports an error and stops; otherwise, executes step 106.

In this embodiment, when it is judged to be yes in this step, the failure information will be reported. For example, the failure information is STATUS_PUSH_TASK_REACHED_THE_MAXIMUM_ERROR; and the first preset value is 3.

In this embodiment, the reporting an error in this step is: reporting the failure information. For example, the failure information is STATUS_PUSH_TASK_REACHED_THE_MAXIMUM_ERROR.

Optionally, in this embodiment, the reporting an error in this step is: reporting the failure information. For example, the failure information is STATUS_PUSH_TASK_REACHED_THE_MAXIMUM_ERROR.

Step 106: the mobile management application deletes all downloaded application installation packages from the application push task database and stops.

In an implementation, all of the application installations packages in this embodiment include mobile management application installation packages and other application installation packages.

Step 107: the mobile management application judges whether there is the mobile management application in the application currently being installed; if so, reports an error and stops; otherwise, executes step 108.

Step 108: the mobile management application adds an updating task for the mobile management application to the application push task database.

For example, in this embodiment, the application push task database is: sma.db, where a data table APPLICATION saving the updating tasks for the mobile management application is saved to sma.db.

Step 109: the mobile management application downloads the application installation package and saves the application installation package in a preset path, and judges whether the application installation package has been downloaded; if so, executes step 114; otherwise, executes step 110.

Step 110: the mobile management application continues downloading the application installation package and judges whether a download is successful; if so, executes step 114; otherwise, executes step 111.

Step 111: the mobile management application judges whether the download of the application installation package has timed out; if so, returns to step 109; otherwise, executes step 112.

Step 112: the mobile management application judges whether the download process has been interrupted; if so, returns to step 109; otherwise, executes step 113.

In this embodiment, the step 112 specifically involves: judging whether there is a task interruption in a download status of the application in the application push task database; if so, returns to step 109; otherwise, executes step 113.

Specifically, in this embodiment, the application push task database records information such as the application installation package of an application push task, an application installation package file name, and the download status.

Step 113: the mobile management application judges whether there has been an internal server error during the download process; if so, reports an error and stops; otherwise, return to step 109.

Specifically, in this embodiment, the step 113 includes: the mobile management application judges whether a "500 error" occurred during the download process; if so, reports an error and stops, otherwise returns to step 109.

In this embodiment, if the application installation package cannot be downloaded due to reasons such as to-be-downloaded resource being not exist, an error will occur on a server terminal. A specific reporting of the error in this step is: reporting the failure information, for example, the failure information is STATUS_PUSH_DOWNLOAD_FILE_ERROR.

Step 114: the mobile management application analysis the download application installation package, and obtains the application version number and an application package name from an analysis result.

Step 115: the mobile management application obtains the application version number of a corresponding installed application based on the application package name, and judges whether the application version number obtained from the parsing result is higher than the application version number of the corresponding installed application; if so, executes step 116; otherwise, stops.

Specifically, in this embodiment, the step 115 includes the following.

Step 115-0: the mobile management application obtains detailed information of the installed application based on the application package name, and obtains the application version number of the corresponding installed application from the detailed information.

Specifically, in this embodiment, the detailed information of the application includes information such as a version number and a version name of the installed application.

Step 115-1: the mobile management application judges whether the application version number obtained from the parsing result is lower than the application version number of the corresponding installed application; if so, reports an error and stops; otherwise, executes steps 115-2.

In this embodiment, when it is judged to be yes in this step, the failure information is reported. For example, the failure information is STATUS_PUSH_LOWER_VERSION_FAILED.

Step 115-2: the mobile management application judges whether the application version number obtained from the parsing result is equal to the application version number of the corresponding installed application; if so, stops; otherwise, executes step 116.

In this embodiment, when it is judged to be yes in this step, the success information is reported. For example, the success information is STATUS_PUSH_SUCCESS.

Step 116: the mobile management application judges whether a currently to-be-installed application is the mobile management application; if so, executes step 122; otherwise, executes step 117.

Step 117: the mobile management application judges whether there are other to-be-installed applications that have been successfully downloaded in the application push task database; if so, executes step 118; otherwise, stops.

Step 118: the mobile management application silently installs other applications and judges an installation is successful; if so, executes step 119; otherwise, stops.

Specifically, in this embodiment, the step 118 includes the following.

Step 118-1: the mobile management application calls a silent installation interface and judges whether the application installation package exists based on an installation package path parameters of the silent installation interface; if so, executes steps 118-2; otherwise, returns failure information through using a callback interface and stops.

For example, the encapsulated silent installation interface in this embodiment is void install (String apkFilePath, InstallResultCallback callback, Class<InstallResultReceiver>receiver); where, apkFilePath is the installation package path, callback is the callback interface, and receiver is the first broadcast receiver;

the callback interface is specifically: public interface InstallResultCallback{
Public void getInstallResult (boolean isSuccess, String pkgName);
}
where, isSuccess is a silent installation result, which includes: success or failure; pkgName is the application installation package name.

Step 118-2: the mobile management application parses the application installation package name from the application installation package and judges whether the application installation package name is empty; if so, returns failure information through using the callback interface and stops; otherwise, executes steps 118-3.

Step 118-3: the mobile management application obtains a first object and creates a second object, sets an installation session mode of the second object, and sets a size of the second object to the size of the application installation package.

For example, in this embodiment, the first object is PackageInstaller, and the second object is PackageInstaller.SessionParams; and the installation session mode (Session is one time of a valid application installation) of the second object is set to FULL_INSTALL (in this mode, if the application is not installed, it will be installed directly; if the application is already installed, it will replace the existing application), and the size of the second object is set to the size of the application installation package (sessionParams.setSize( )).

Step 118-4: the mobile management application takes the second object as a parameter, creates an installation session based on the first object, and obtains a corresponding installation session identifier;

that is, the mobile management application passes the second object to the first object, and creates the installation session based on the first object.

In an implementation, the installation session in this step is "Session", and the installation session identifier is "SessionId".

Step 118-5: the mobile management application judges values of the installation session identifier; if it is the first preset value, returns creation failure information through the callback interface and stops; otherwise, executes steps 118-6.

In an implementation, the first preset value in this step is −1.

Step 118-6: the mobile management application copies the application installation package to a specified directory based on the first object, the installation session identifier and the installation package path, and judges whether it is successfully copied; if so, executes step 118-7; otherwise, returns installation failure information through the callback interface and stops.

Specifically, in this step, the mobile management application copies the application installation package to the specified directory through a copy interface based on the first object, the installation session identifier and installation package path. For example, the copy interface is Session.openWrite ("base.apk", 0, apkFile.length( )).

Step 118-7: the mobile management application installs the application based on the first object, the installation session identifier, the installation package path and the first broadcast receiver.

Specifically, in this embodiment, the mobile management application takes the first object, the installation session identifier, a parameter installation package path and first broadcast receiver as parameters, and installs the application through calling a PackageInstaller method.

Furthermore, when the PackageInstaller method is called, the PackageInstaller method judges the installation mode of the session mode. If the current application is not installed yet, it will be installed directly; and if the current application is already installed, an overlay installation will begin. If there is an error during the installation process, installation error information is returned through the callback interface and stops; otherwise, a system is notified to broadcast an installation result.

In this embodiment, the first broadcast receiver listens to the broadcast sent by the system, the application providing the system interface obtains an application installation status from the broadcast, and notifies the callback interface to return the corresponding installation result to the mobile management application based on the extracted application installation status. The mobile management application saves the installation result after receiving the installation result, where and the installation result includes successful installation or failed installation.

For example, the system issues the broadcast of "android.content.pm.extra.STATUS", and InstallResultReceiver listens to the broadcast of "android.content.pm.extra.STATUS" to obtain the status "status" of the application installation of "android.content.pm.extra.STATUS" and the application installation package name "packageName" from the broadcast.

If "status" equals to PackageInstaller.STATUS_SUCCESS (the value of which is 0), indicating a successful installation, the callback interface returns the installation result of the successful installation; otherwise, indicating a failed installation, the callback interface returns the installation result of the failed installation.

Step 119: the mobile management application updates an installed application list, reports application successful installation information to the backend server, and deletes the application installation package that has been successfully installed.

Specifically, in this embodiment, the mobile management application updates the installed application list includes: the mobile management application adds information about successfully installed applications to the installed application list.

Step 120: the mobile management application judges whether there is an application waiting to be installed in the application push task database; if so, executes step 121; otherwise, stops;

Step 121: the mobile management application obtains an application waiting to be installed from the application push task database, and returning to step 109.

Step 122: the mobile management application sends a broadcast to update the mobile management application.

For example, in this embodiment, the broadcast is SEND_UPDATE_SMA_ACTION.

Step 123: when the application providing the system interface receives the broadcast to update the mobile management application, judges whether the mobile management application update package path is empty; if so, reports an error and stops; otherwise, executes step 124.

In this embodiment, the step 123, the following is further included:

step A1: the application providing the system interface registers to listen to a second broadcast receiver of the broadcast for updating the mobile management application sent by the mobile management application.

In this embodiment, the obtaining the application installation package path from the received broadcast specifically includes: obtaining the application installation package path from the received broadcast through an obtaining interface. For example, a startup service interface in this step is startService( ), which is a standard interface for the Android system; and the obtaining interface is String getApkPackageName (String apkPath).

For example, a status bar is frameworks/base/packages/SystemUI/src/com/android/systemui/statusbar/phone/StatusBar.java, and an action to update the mobile management application is "com.feitian.storm.smaagent. update_sma" Action.

The second broadcast receiver in this embodiment is used to listen to the broadcast to update the mobile management application sent by the mobile management application.

Step 124: the application providing the system interface initiates an installation service for a mobile management application, silently installs a new version of the mobile management application based on the mobile management application update package, and judges whether the installation is successful; if so, executes step 125; otherwise, executes step 126.

In this embodiment, when the application providing the system interface silently installs the new version of the mobile management application, the Android system will kill a running old version of the mobile management application.

In this embodiment, the application providing the system interface needs to be modified and sets some parameters before silently installing the new version of the mobile management application based on the mobile management application update package includes:

declaring an application installation permission in a configuration list file of the application providing the system interface; configuring the first broadcast receiver in the configuration list file, where the first broadcast receiver is used to listen to the broadcast of a silently installed application result; modifying a permission configuration file of the application providing the system interface, and adding the application installation permission to the application providing the system interface. For example, the configuration list file is AndroidManifest.xml; and the permission configuration file of the application providing the system interface is /frameworks/base/data/etc/com.android.system-ui.xml.

Specifically, in this embodiment, the step 124 includes:

step H1: the application providing the system interface initiates the installation service for the mobile management application through a startup service interface;

step H2: the application providing the system interface calls an encapsulated silent installation interface, and judges whether the mobile management application update package exists based on the mobile management application update package path; if so, executes step H3; otherwise, returns the failure information through using the callback interface and stops.

For example, in this embodiment, the encapsulated silent installation interface is void install (String apkFilePath, InstallResultCallback callback, Class<InstallResultReceiver>receiver); where, apkFilePath is the installation package path, callback is the callback interface, and receiver is the first broadcast receiver;

the callback interface is specifically: public interface InstallResultCallback

{Public void getInstallResult (boolean isSuccess, String pkgName);
} where, isSuccess is a silent installation result, which includes: success or failure; and pkgName is the mobile management application update package name.

Step H3: the application providing the system interface parses the mobile management application update package name from the mobile management application update package, and judges whether the mobile management application update package name is empty; if so, returns the failure information through using the callback interface and stops; otherwise, executes step H4.

Step H4: the application providing the system interface obtains the first object and creates the second object, sets the installation session mode of the second object, and sets the size of the second object to be the size of the mobile management application update package.

For example, in this embodiment, the first object is PackageInstaller, and the second object is PackageInstaller.SessionParams; and the installation session mode (Session is one time of a valid application installation) of the second object is set to FULL_INSTALL (in this mode, if the application is not installed, it will be installed directly; and if the application is already installed, it will replace the existing application), and the size of the second object is set to the size of the application update package (sessionParams. setSize( )).

Step H5: the application providing the system interface creates the installation session for the mobile management application based on the first object and the second object, and obtains the corresponding installation session identifier.

In an implementation, the application providing the system interface creates the installation sessions for the mobile management applications based on the first object and the second object through a creating interfaces. For example, the creating interface in this step is Int createSession (PackageInstaller packageInstaller, PackageInstaller. SessionParams sessionParams); the installation session is "Session", and the installation session identifier is "SessionId".

Step H6: the application providing the system interface judges the value of the installation session identifier. If it is the first preset value, returns the creation failure information through the callback interface and stops; otherwise, executes step H7.

In an implementation, the first preset value in this step is −1.

Step H7: the application providing the system interface copies the mobile management application update package to a specified directory based on the first object, the installation session identifier and the mobile management application update package path, and judges whether it is successfully copied; if so, executes step H8; otherwise, returns the installation failure information through the callback interface and stops.

Specifically, in this step, the mobile management application copies the mobile management application update package to the specified directory through a copy interface based on the first object, the installation session identifier and the installation package path. For example, the copy interface is: boolean copyInstallFile (PackageInstaller packageInstaller, int sessionId, String apkFilePath).

Step H8: the application providing the system interface starts installing the mobile management application based on the first object, the installation session identifier, the mobile management application update package path and the first broadcast receiver. If there is an error during the installation process, it returns the installation error information through the callback interface; otherwise, executes step H9.

Specifically, in this embodiment, the mobile management application takes the first object, the installation session identifier, the mobile management application update package path and the first broadcast receiver as parameters, and calls an installation interface to start installing the mobile management application. For example, the installation interface is boolean execInstallCommand (PackageInstaller packageInstaller, int sessionId, Class<InstallResultReceiver>receiver, String pkgName).

Step H9: the application providing the system interface judges whether the installation of the mobile management application is successful; if so, the application providing the system interface issues a successful installation broadcast, and executes step 125; otherwise, the application providing the system interface issues a failed installation broadcast, and executes step 126.

In this embodiment, the first broadcast receiver is used to listen to the broadcast of application installation status changes issued by a bottom layer of the Android system, extract the status from the listened broadcast, and notify the callback interface to return the corresponding installation result based on the status; where the installation result includes successful installation or failed installation.

For example, the system issues the broadcast of "android.content.pm.extera.STATUS", and InstallResultReceiver listens to the broadcast of "android.content.pm.extera.STATUS" to obtain the status "status" of the application installation of "android.content.pm.extra.STATUS" and the application installation package name "packageName" from the broadcast.

If the value of "status" is 0, it indicates the successful installation, and a successful installation result is returned through the callback interface; otherwise, it indicates the failed installation, and the callback interface returns a failed installation result.

In this embodiment, InstallSmaService (the installation service for the mobile management applications) is a custom implemented class, that inherits from the "Service" (service) component of Android (Android system), which has no interface, runs in the background, and is suitable for performing time-consuming and interface free operations. After the "Service" is started, based on the application installation package path (apkPath) obtained from the previous broadcast, the "InstallResultReceiver" and "InstallResultCallback" callback interfaces declared in the configuration list, the SMA (Mobile Management Application) update package is silently installed, the installation result is returned through the "InstallResultCallback" callback interface, and a file name of the SMA update package is renamed based on the installation result in the callback interface; and InstallSmaService starts a core service of the SMA in a startService( ) mode. Implementations of the silent installation is encapsulated in "InstallUtils.java", which encapsulates interface (the interface mentioned in the previous silently installed application process) implementations related to silently installed applications, including: an obtaining interface, an encapsulating interface, a callback interface, a creating interface, a copy interface, an installation interface, a renaming interface and the like.

Step 125: the application providing the system interface changes the mobile management application update package as a successful update file for the mobile management application, and initiates the new version of the mobile management application.

In this embodiment, the step 125 specifically includes: the application providing the system interface changes the file name of the mobile management application update package as: original file name plus successful updated by the renaming interface.

For example, the renaming interface is: void renameFile (String path, boolean value); the original file name of the mobile management application update package is "SMAAgent_V1.1.1.100198.211125_release-signed.apk". If the update is successful, the file name of the mobile management application update package will be changed to "SMAAgent_V1.1.1.100198.211125_release-signed.apk.true".

Step 126: the application providing the system interface changes the mobile management application update package as a failed update file for the mobile management application, and initiates the old version of the mobile management application.

In this embodiment, the step 126 specifically includes: the application providing the system interface changes the file name of the mobile management application update package as: original file name plus failed updated by the renaming interface;

For example, the original file name of the mobile management application update package is "SMAAgent_V1.1.1.100198.21125_release-signed.apk". If the update fails, the file name of the mobile management application update package will be changed to "SMAAgent_V1.1.1.100198.211125_release-signed.apk.false".

Specifically, in this embodiment, the application providing the system interface initiates (old or new version of) the mobile management applications includes the following.

Step P1: the application providing the system interface starts a main service of the mobile management application through the installation service for the mobile management application that has been started, sets an operation parameter passed in from starting the main service of the mobile management application as updating the mobile management application, and saves an installation result of updating the mobile management application; where the main service of the mobile management application inherits service components of the Android standard.

In this embodiment, the application providing the system interface calls the installation service for the mobile management application that has already been initiated, and the installation service for the mobile management application starts the main service of the mobile management application through the startService( ) interface; and updates the mobile management application to com.feitan.storm.smaagent.upgrade_sma.

Specifically, if the old version of the mobile management application is initiated, the corresponding installation result is the failed installation; and if the new version of the mobile management application is initiated, the corresponding installation result is the successful installation.

Step P2: the mobile management application judges whether a current running process is the main process of the mobile management application; if so, initializes the mobile management application; otherwise, stops.

Furthermore, the initializing the mobile management application includes: initializing a system development software toolkit, initializing some tool auxiliary classes, obtaining a location service for reporting device positioning, initializing the application push task database, initializing components for downloading files, and initializing the third broadcast receiver;

where, the initializing the third broadcast receiver includes: listening to the broadcast of the system network connection changes, and initializing a push environment; the initializing the push environment specifically includes: executing operations for initializing the push environment when the device network is detected to be changed, starting the backend server, and connecting to the backend server; when successfully connecting to the backend server, starting a database connecting service, checking statuses of various push tasks of the mobile management application, and reporting to the backend server. For example, the broadcast for listening to the system network connection changes is: ConnectivityManager.CONNECTIVITY_ACTION ("android.net.conn.CONNECTIVITY_CHANGE").

In an implementation, the checking statuses of various push tasks of the mobile management application and reporting to the backend server includes: checking the application push task database, which corresponds to a previous check for an application push task process after the mobile management application is initiated. If there are any updated records of the mobile management application, they will be synchronized to the backend server based on final update results;

other important services in the mobile management applications are service components that inherit the Android standard. And the other services include: services initiated when a device is turned on, which is used to update firmware of a security chip when the device is turned on; various push command services used to maintain communications with the servers, which are issued by the backend servers and received by the mobile management application through using the push environment; services used to maintain the application push task database and execute various tasks for the mobile management applications; and services initiated if the device is in an active state after startup, which is used to synchronize the device status (including: a device system status, a network status, and location information Step P3: the main service (MainService) of the mobile management application checks whether the passed-in operation parameters are updating the mobile management application; if so, obtains the saved installation result, and judges whether the mobile management application has been successfully updated based on the installation result; if so, executes step P4; otherwise, stops.

For example, the installation result in this step is an "installResult" field.

Step P4: the mobile management application checks whether there are any installation task records for the mobile management application in the application push task database; if so, updates the push status of the mobile management application update task in the application push task database based on the installation result; otherwise, stops.

In an implementation, the updating the push status of the mobile management application update task in the application push task database based on the installation results includes: if the installation result is true, the push status will be updated to STATUS_PUSH_SUCCESS; otherwise, the push status will be updated to STATUS_PUSH_FAILED; and in this step, the push status is only updated and not reported to the server.

Figures 4A, 4B:
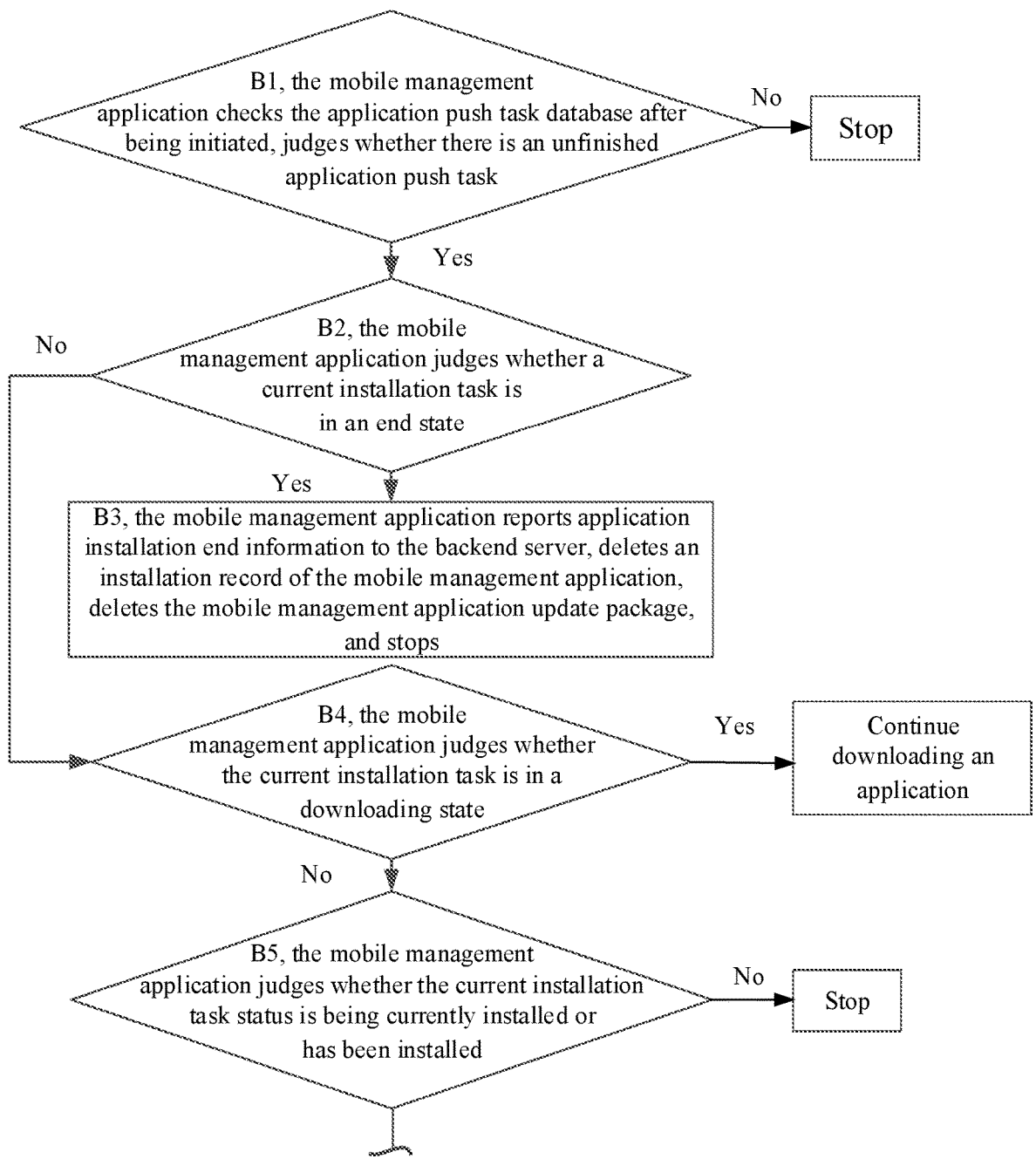
FIGS. 4A and 4B are a flowchart of an application automatically initiating a self-inspection after completing an update on the mobile management application in Embodiment 2 of the present disclosure.
Figure 4B:
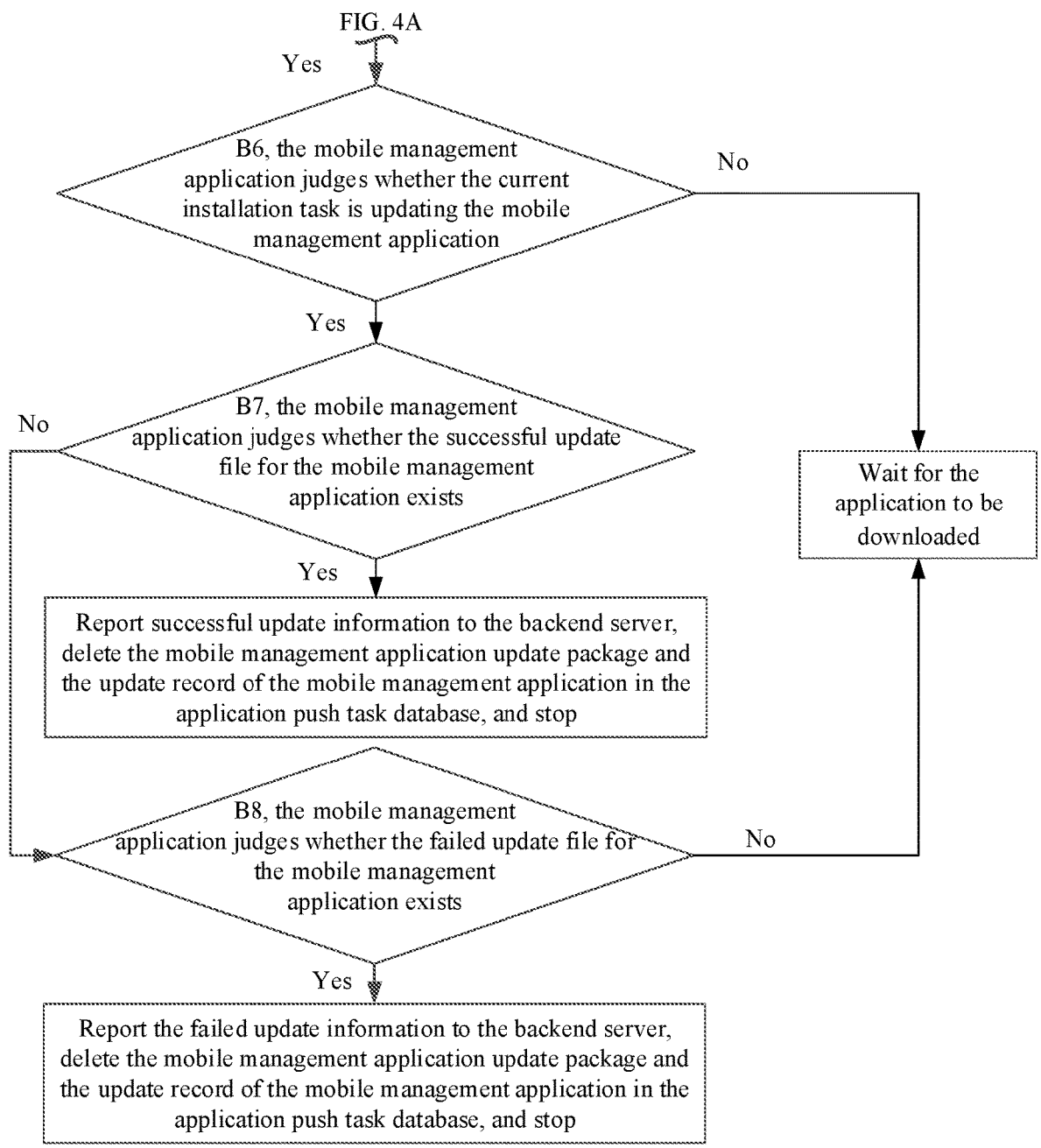

In this embodiment, after updating the mobile management application, the application providing the system interface initiates the mobile management application, and the mobile management application executes a self-inspection after being initiated. The specific process is shown in FIGS. 4A and 4B, including:

step B1: the mobile management application checks the application push task database after being initiated, judges whether there is an unfinished application push task; if so, executes step B2; otherwise, stops.

In an implementation, before the step B1, the following is further included: the backend server initiates the push task and sends a to-be-pushed list to the mobile management application; and the mobile management application receives the to-be-pushed list and saves the to-be-pushed list in a data table of the application push task database.

Specifically, the judging whether unfinished application push task exists includes: traversing all status words in the data table of the application push task database. If all of the status words are have been pushed, no unfinished application push task exists; otherwise an unfinished application push task exists.

Step B2: the mobile management application judges whether a current installation task is in an end state; if so, executes step B3; otherwise, executes step B4.

Step B3: the mobile management application reports application installation end information to the backend server, deletes an installation record of the mobile management application, deletes the mobile management application update package, and stops.

Step B4: the mobile management application judges whether the current installation task is in a downloading state; if so, continues downloading an application; otherwise, executes step B5.

Step B5: the mobile management application judges whether the current installation task status is being currently installed or has been installed; if so, executes step B6; otherwise, stops.

Step B6: the mobile management application judges whether the current installation task is updating the mobile management application; if so, executes step B7; otherwise, waits for the application to be downloaded.

Step B7: the mobile management application judges whether the successful update file for the mobile management application exists; if so, reports successful update information to the backend server, deletes the mobile management application update package and the update record of the mobile management application in the application push task database, and stops; otherwise, executes step B8.

Specifically, the mobile management application judges whether the successful update file for the mobile management application exists, which specifically includes: the mobile management application judges whether there is a file with the mobile management application update package name plus successfully updated in the preset path; if so, it exists, otherwise, it does not.

Step B8: the mobile management application judges whether a failed update file for the mobile management application exists; if so, reports the failure update information to the backend server, deletes the mobile management application update package and the update records of the mobile management application in the application push task database, and stops; otherwise, waits for the application to be downloaded.

Specifically, the mobile management application judges whether the failed update file for the mobile management application exists, which specifically includes: the mobile management application judges whether there is the file with the mobile management application update package name plus failed updated in the preset path; if so, it exists, otherwise, it does not exist.

The application providing the system interface is a system resident application, which can be automatically restarted quickly after being killed; it has system permissions and an ability to perform high-privileged operations such as silently installation without visual impact on the users; and it can also smoothly initiates related services of the mobile management application when the mobile management application is installed. The application providing the system interface can not only silently install the mobile management applications, but also silently install other applications.

This solution pushes the mobile management application update package through the backend server. After downloading the update package, the mobile management application notifies the application providing the system interface to update the mobile management application and initiates the related services of the mobile management application. During this period, there is no need to restart the smart POS device and there is no perception to the user. A seamless update of the mobile management application further ensures control of the smart POS device. The disclosed technical solution is not only applicable to the smart POS devices, but also to other terminal devices such as mobile phones and tablets.

Embodiment 3

Figure 5:
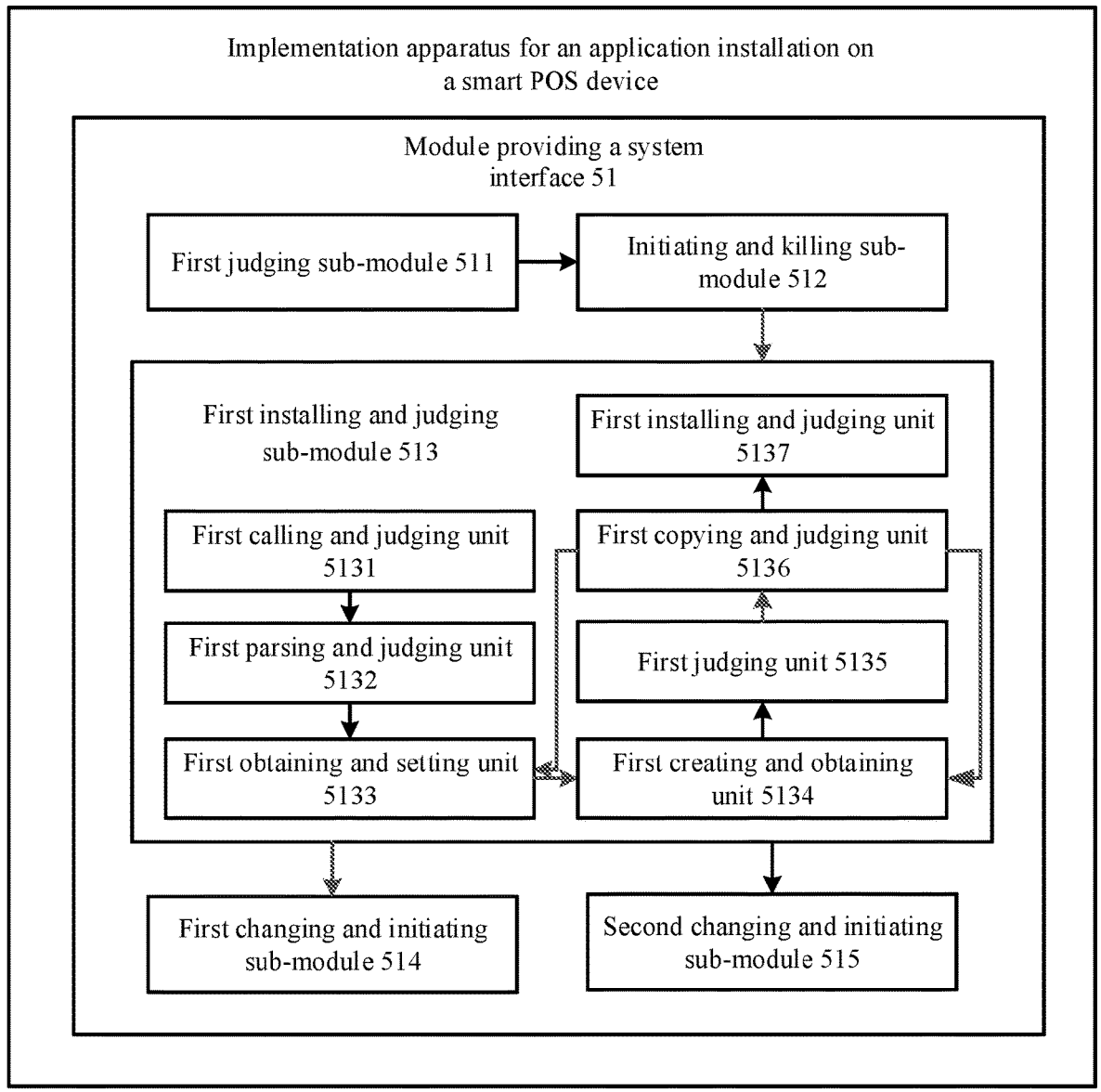
FIG. 5 is a block diagram of an implementation apparatus for an application installation on a smart POS device provided by Embodiment 3 of the present disclosure.

Embodiment 3 of the present disclosure provides an implementation apparatus for an application installation on a smart POS device, as shown in FIG. 5, including: a module providing a system interface 51, and the module providing the system interface 51 includes:

a first judging sub-module 511, configured to judge whether a mobile management application update package path in a broadcast for updating a mobile management application is empty when receiving the broadcast, if it is not empty, triggering an initiating and killing sub-module 512;

the initiating and killing sub-module, configured to initiate an installation service for the mobile management applications and trigger a first installing and judging sub-module 513;

the first installing and judging sub-module 513, configured to silently install a new version of the mobile management application based on a saved update package of the mobile management application, and judge whether the new version of the mobile management application has been successfully installed; if so, triggers a first changing and initiating sub-module 514, otherwise, triggers a second changing and initiating sub-module 515; when the new version of mobile management application is silently installed by the first installing and judging sub-module 513, a running old version of the mobile management application will be killed by the Android system.

Specifically, the first installing and judging sub-module 513 in this embodiment includes:

a first calling and judging unit 5131, configured to call an encapsulated silent installation interface, and judge whether the mobile management application update package exists based on the mobile management application update package path, if it exists, triggers a first parsing and judging unit 5132;

the first parsing and judging unit 5132, configured to parse a mobile management application update package name from the mobile management application update package, and judge whether the mobile management application update package name is empty, if it is not empty, triggers a first obtaining and setting unit 5133;

the first obtaining and setting unit 5133, configured to obtain a first object and create a second object, set an installation session mode of the second object, and set a size of the second object to be a size of the mobile management application update package;

a first creating and obtaining unit 5134, configured to create an installation session for the mobile management application based on the first object and the second object, and obtain a corresponding installation session identifier;

a first judging unit 5135, configured to judge a value of the installation session identifier, if it is not a first preset value, triggers a first copying and judging unit 5136;

the first copying and judging unit 5136, configured to copy the mobile management application update package to a specified directory based on the first object, the installation session identifier and the mobile management application update package path, and judge whether it is successfully copied, if it is successfully copied, triggers a first installing and judging unit 5137;

the first installing and judging unit 5137, configured to install the mobile management application based on the first object, the installation session identifier, the mobile management application update package path and a first broadcast receiver; if an error occurs during an installation process, report an error and stop; otherwise, judge whether the new version of the mobile management application has been successfully installed; if so, triggers a first changing and initiating sub-module 514; otherwise, triggers a second changing and initiating sub-module 515;

the first changing and initiating sub-module 514, configured to change the mobile management application update package to an update successful file of the mobile management application, and initiate the new version of the mobile management application;

the second changing and initiating sub-module 515, configured to change the mobile management application update package to an update failed file of the mobile management application, and to initiate the old version of the mobile management application.

In an implementation Optionally, the module providing the system interface 51 in this embodiment further includes: a first registering sub-module, configured to register to listen to a second broadcast receiver of the broadcast for updating the mobile management application.

In an implementation, the apparatus in this embodiment further includes: a first configuring and modifying module, configured to declare an application installation permission in a configuration list file of the module providing the system interface 51; configure the first broadcast receiver for listening to the broadcast of a silently installation result in the configuration list file; modify a permission configuration file of the application providing the system interface, and add the application installation permission to the module providing the system interface 51.

In this embodiment, the first judging sub-module 511 is specifically configured to: obtain the mobile management application update package path from the received broadcast through an obtaining interface when receiving the broadcast for updating the mobile management application; and judge whether the obtained the mobile management application update package path is empty, if it is not empty, triggers the initiating and killing sub-module 512.

In this embodiment, the first installing and judging sub-module 513 is further configured to: if an installation is successful, set the installation result as successful installation, and issue the broadcast for updating the mobile management application through using the installation result as a parameter; and if the installation fails, set the installation result as failed installation, and issue the broadcast for updating the mobile management application through using the installation result as a parameter.

Specifically, the apparatus in this embodiment also includes a mobile management module.

The first broadcast receiver listens to the broadcast of application installation status changes sent by a bottom layer of the Android system, retrieves an application installation status from the broadcast, and notifies a callback interface to return the corresponding installation result to the mobile management module based on the application installation status, and the mobile management application saves the received installation result.

The first changing and initiating sub-module 514 initiates the new version of the mobile management application, or the second changing and initiating sub-module 515 initiates the old version of the mobile management application, specifically including:
  starting a main service of the mobile management application through a started service for installing the mobile management application, setting operation parameters passed in from the main service for initiating the mobile management application as updating the mobile management application, and saving the updated installation result of the mobile management application; where the main service of the mobile management application inherits service components of the Android standard;
  the mobile management module is configured to judge whether a current running process is a main process of the mobile management application; if so, initialize the mobile management application; otherwise, stop;
  where the initializing the mobile management application in this embodiment includes: initializing an application push task database, initializing components used to download files, and initializing a third broadcast receiver;
  furthermore, the initializing the third broadcast receiver includes: listening to the broadcast of a system network connection change and initializing the push environment;
  furthermore, the initializing the push environment specifically includes: executing an operation for initializing the push environment when a device network is detected to be changed, starting the backend server, and connecting to the backend server; when the backend server is successfully connected to, starting a database connecting service, checking statuses of various push tasks of the mobile management application, and reporting to the backend server; and
  the mobile management module is configured to check whether the operation parameter passed in from the starting the main service of the mobile management application is the updating the mobile management application; if so, obtain the saved installation result and judge whether the mobile management application has been successfully updated based on the installation result; if it is successfully updated, check whether there are still installation task records for the mobile management application in the application push task database; if so, update a push status of a mobile management application update task in the application push task database based on the installation result; otherwise, stop; and if it fails to update, stop.

After the mobile management application is initiated, the mobile management module is used for self-inspection. The mobile management module includes:
  a checking and judging sub-module, configured to check the application push task database after the mobile management application is initiated, and judge whether there are any unfinished application push tasks; if so, trigger a second judging sub-module, otherwise, stop;
  the second judging sub-module, configured to judge whether a current installation task is in an end state; if so, trigger a reporting and deleting sub-module; otherwise, trigger a third judging sub-module;
  the reporting and deleting sub-module, configured to report application installation ending information to the backend server, delete an installation record of the mobile management applications, delete the mobile management application update packages, and stop;
  the third judging sub-module, configured to judge whether the current installation task is in a downloading state; if so, continue downloading the application, otherwise, trigger a fourth judging sub-module;
  the fourth judging sub-module, configured to judge whether a current installation task status is being currently installed or has been installed; if so, trigger a fifth judging sub-module, otherwise, stop;
  the fifth judging sub-module, configured to judge whether the current installation task is updating the mobile management application; if so, trigger a first judging and deleting sub-module, otherwise, wait for the application to be downloaded;
  the first judging and deleting sub-module, configured to judge whether the successful update file for the mobile management application exists; if so, report successful update information to the backend server, delete the mobile management application update package and the update record of the mobile management application in the application push task database, and stop; otherwise, trigger a second judging and deleting sub-module;
  the second judging and deleting sub-module, configured to judge whether an update failed file of the mobile management application exists; if so, report failed update information to the backend server, delete the mobile management application update package and the update record of the mobile management application in the application push task database, and stop; otherwise, wait for the application to be downloaded.

Optionally, In this embodiment, the mobile management module further includes a receiving and saving sub-module, configured to receive a to-be-pushed list sent by the backend server after the backend server initiates a push task, and save the to-be-pushed list in a data table of the application push task database.

In this embodiment, the checking and judging sub-module judges whether there are unfinished application push tasks, including: the checking and judging sub-module traverses all status words in the data table of the application push task database; if all of the status words are pushed, there are no unfinished application push tasks; otherwise; there are unfinished application push tasks.

In an implementation, the mobile management module in this embodiment further includes:
- a first receiving sub-module, configured to receive an application installation package pushed by the backend server;
- a sixth judging sub-module, configured to judge whether a download condition is met; if so, trigger a first adding sub-module; otherwise, report an error and stop;
- the first adding sub-module, configured to add an application downloading task to the application push task database, and trigger a downloading sub-module;
- the downloading sub-module, configured to download the application; if it is successfully downloaded, trigger a seventh judging sub-module;
- the seventh judging sub-module, configured to judge whether a current to-be-installed application that has been successfully downloaded meets the installation condition; if so, trigger a first judging and notifying sub-module;
- the first judging and notifying sub-module, configured to judge whether the current to-be-installed application is the mobile management application; if so, the mobile management application broadcasts to notify the application providing the system interface to update the mobile management application; otherwise, trigger an eighth judging sub-module;
- the eighth judging sub-module, configured to judge whether there are other to-be-installed applications that have been successfully downloaded in the application push task database; if so, trigger an installing and processing sub-module, otherwise, stop;
- the installing and processing sub-module, configured to silently install other applications; if it is successfully installed, update an installed application list, report application successful installation information to the backend server, delete the application installation package that has been successfully installed, and trigger a judging and obtaining the sub-module;
- the judging and obtaining the sub-module, configured to judge whether there is an application waiting to be downloaded in the application push task database; if so, obtain an application waiting to be downloaded, and trigger the downloading sub-module; otherwise, stop.

Furthermore, the sixth judging sub-module includes:
- a second judging unit, configured to judge whether an application installation package name is empty; if so, report an error and stop; otherwise, trigger a third judging unit;
- the third judging unit, configured to judge whether an application version number in the application installation package is higher than an application version number of a corresponding application that has been installed; if so, trigger a first querying and judging unit; otherwise, report an error and stop;
- the first querying and judging unit, configured to query the application push task database and judge whether an amount of application installation tasks in the application push task database is within a preset range; if so, trigger a fifth judging unit; otherwise, trigger a fourth judging unit;
- the fourth judging unit, configured to judge whether the amount of application installation tasks in the application push task database is equal to the first preset value; if so, report an error and stop; otherwise, trigger a first deleting unit;
- the first deleting unit, configured to delete all of the application installation packages that have been downloaded from the application push task database, and stop; and
- the fifth judging unit, configured to judge whether there is the mobile management application in the applications currently being installed; if so, report an error and stop; otherwise, trigger the first adding sub-module.

Furthermore, the downloading sub-module in this embodiment includes:
- a downloading, saving and judging unit, configured to download the application installation package and save it in a preset path, judge whether the application installation package has been downloaded; if so, trigger the seventh judging sub-module; otherwise, trigger a continue downloading and judging unit;
- the continue downloading and judging unit, configured to continue downloading the application installation package and judge whether it is successful download; if so, trigger a seventh judging sub-module; otherwise, trigger a sixth judging unit;
- the sixth judging unit, configured to judge whether the download of the application installation package has timed out; if so, trigger the downloading, saving and judging unit; otherwise, trigger a seventh judging unit;
- the seventh judging unit, configured to judge whether a download process has been interrupted; if so, trigger the downloading, saving and judging unit; otherwise, trigger an eighth judging unit;
- the eighth judging unit, configured to judge whether there has been an server internal error during the download process; if so, report an error and stop; otherwise, trigger the downloading, saving and judging unit.

Furthermore, the seventh judging sub-module in this embodiment is specifically configured to judge whether the application version number in the application installation package is higher than the corresponding application version number the application that has been installed; if so, trigger the first judging and notifying sub-module; otherwise, stop.

Furthermore, in this embodiment, the installing and processing sub-module includes:
- a second calling and judging unit, configured to call a silent installation interface, judge whether the application installation package exists based on installation package path parameters of the silent installation interface; if so, trigger a second parsing and judging unit; otherwise, report an error and stop;
- the second parsing and judging unit, configured to parse the application installation package name from the application installation package, and judge whether the application installation package name is empty; if so, report an error and stop; otherwise, trigger a second obtaining and setting unit;

the second obtaining and setting unit, configured to obtain the first object and create the second object, set the installation session mode of the second object, and set the size of the second object to the size of the application installation package;

a second creating and obtaining unit, configured to take the second object as a parameter, create the installation session based on the first object, and obtain the corresponding installation session identifier;

a ninth judging unit, configured to judge the value of the installation session identifier; if it is the first preset value, report an error and stop; otherwise, trigger a second copying and judging unit;

the second copying and judging unit, configured to copy the application installation package to the specified directory based on the first object, the installation session identifier and the installation package path, and judge whether it is successfully copied; if so, trigger a second installing and judging unit; otherwise, report an error and stop;

the second installing and judging unit, configured to install the application based on the first object, the installation session identifier, the installation package path and the first broadcast receiver; if it is successfully installed, update the installed application list, and report the application successful installation information to the backend server; delete the application installation package that has been successfully installed, and trigger the judging and obtaining sub-module.

Technical solutions of the present disclosure can use a backend server to push the mobile management application update packages without installing an application market on the smart POS device, and use the application providing the system interface to install and update the mobile management application and restart the mobile management application, an update of the mobile management application can be achieved without restarting the smart POS device, while ensuring the control of the mobile management application over the intelligent POS device, and making it convenient for users to use.

In an implementation, an embodiment of the present application also provides a smart POS device, which includes at least one processor, a memory, and instructions stored on the memory that can be executed by the at least one processor. The at least one processor executes the instructions to implement the implementation method for the application installation on the smart POS device in the above embodiment. When the smart POS device is a chip system, it can be composed of chips, or include chips and other discrete devices, which is not specifically limited in the embodiment of the present application. The chip is coupled with the memory for executing computer programs stored in the memory, so as to execute the implementation method for the application installation on the smart POS device disclosed in the above embodiment.

In the above embodiments, it can be fully or partially implemented through software, hardware, firmware, or any combination thereof. When implemented using software programs, it can be fully or partially implemented in a form of a computer program product. The computer program product includes one or more computer programs. When loading and executing the computer programs on a smart POS device, all or part of processes or functions described in the embodiments of the present application are generated. The computer program can be stored in a computer-readable storage medium or transmitted from one computer-readable storage medium to another, for example, the computer instructions can be transmitted from a base station, a smart POS device, a server or a data center to another base station, smart POS device, server or data center through wired (such as a coaxial cable, fiber optic, a digital subscriber line (digital subscriber line, DSL)) or wireless (such as infrared, wireless, microwave and the like) methods. The computer-readable storage medium can be any available medium that can be accessed by the smart POS device, or can be include one or more data storage devices such as servers and data centers that can be integrated with the medium. The available media can be magnetic media (such as floppy disks, hard drives, magnetic tapes), optical media (such as DVD), or semiconductor media (such as solid state disks (solid state disk, SSD)) and the like. In the embodiment of the present application, the smart POS device may include the aforementioned apparatus.

Although the present application has been described in conjunction with various embodiments, in an implementing process of the present application claimed to be protected, those skilled in the art can understand and implement other variations of the disclosed embodiments by reviewing the accompanying drawings, disclosed content, and the attached claims. In the claims, a term of "comprising" (comprising) does not exclude other components or steps, and "a" or "an" does not exclude a multiple situation. A single processor or other unit may implement several functions listed in the claims. A fact that certain measures are recorded in different dependent claims does not mean that these measures cannot be combined to produce good effects.

Although the present application has been described in conjunction with specific features and embodiments, it is evident that various modifications and combinations can be made without departing from spirit and scope of the present application. Correspondingly, this specification and the accompanying drawings are only exemplary explanations of the present application as defined in the attached claims, and are deemed to have covered any and all modifications, variations, combinations, or equivalents within the scope of the present application. Obviously, those skilled in the art can make various modifications and variations to the present application without departing from the spirit and scope of the present application. In this way, if these modifications and variations of the present application fall within the scope of the claims and their equivalent technologies, the present application also intends to include these modifications and variations.

What is claimed is:

1. An implementation method for an application installation on a smart Point of Sale (POS) device, comprising:

step S1: judging, by an application providing a system interface, whether a mobile management application update package path in a broadcast for updating a mobile management application is empty when receiving the broadcast; if the mobile management application update package path is not empty, executing step S2;

step S2: starting, by the application providing the system interface, an installation service for the mobile management application, silently installing a new version of the mobile management application based on a saved mobile management application update package, and judging whether the new version of the mobile management application has been successfully installed, if so, executing step S3; otherwise, executing step S4; wherein when the new version of the mobile management application is silently installed, a running old version of the mobile management application is killed by an operating system;

step S3: changing, by the application providing the system interface, a mobile management application update package as a successful update file for the mobile management application, and initiating the new version of the mobile management application;

step S4: changing, by the application providing the system interface, the mobile management application update package as a failed update file for the mobile management application, and initiating the old version of the mobile management application;

the silently installing the new version of the mobile management application based on the saved mobile management application update package comprises:

step S21: calling, by the application providing the system interface, an encapsulated silent installation interface, and judging whether the mobile management application update package exists based on the mobile management application update package path; if the mobile management application update package exists, executing step S22;

step S22: parsing, by the application providing the system interface, a mobile management application update package name from the mobile management application update package, and judging whether the mobile management application update package name is empty; if the mobile management application update package name is not empty, executing step S23;

step S23: obtaining, by the application providing the system interface, a first object and creating a second object, setting an installation session mode of the second object, and setting a size of the second object to be a size of the mobile management application update package;

step S24: creating, by the application providing the system interface, an installation session for the mobile management application based on the first object and the second object, and obtaining a corresponding installation session identifier;

step S25: judging, by the application providing the system interface, a value of the installation session identifier; and if the value of the installation session identifier is not a first preset value, executing step S26;

step S26: copying, by the application providing the system interface, the mobile management application update package to a specified directory based on the first object, the installation session identifier and the mobile management application update package path, and judging whether the replication is successful; if the replication is successful, executing step S27;

step S27: installing, by the application providing the system interface, the mobile management application based on the first object, the installation session identifier, the mobile management application update package path and a first broadcast receiver; if an error occurs during an installation process, reporting an error and stopping; otherwise, judging whether the new version of the mobile management application has been successfully installed.

2. The method according to claim 1, before the step S1, further comprising:

step A1: registering to listen to, by the application providing the system interface, a second broadcast receiver of the broadcast for updating the mobile management application.

3. The method according to claim 1, before silently installing the new version of the mobile management application based on the saved mobile management application update package, further comprising: declaring an application installation permission in a configuration list file of the application providing the system interface; configuring the first broadcast receiver in the configuration list file, wherein the first broadcast receiver is used to listen to the broadcast of a silently installed application result; modifying a permission configuration file of the application providing the system interface, and adding the application installation permission to the application providing the system interface.

4. The method according to claim 1, wherein the judging whether the mobile management application update package path in the broadcast is empty comprises: obtaining the mobile management application update package path from the received broadcast through an obtaining interface, and judging whether the obtained mobile management application update package path is empty.

5. The method according to claim 1, wherein the step S2 further includes: if the installation is successful, setting, by the application providing the system interface, an installation result as that installation is successful, and issuing the broadcast for updating the mobile management application through using the installation result as a parameter; if the installation fails, setting, by the application providing the system interface, the installation result as that installation failed, and issuing the broadcast for updating the mobile management application through using the installation result as the parameter;

listening to, by the first broadcast receiver, the broadcast of an application installation status changes issued by a bottom layer of the operating system, retrieving the application installation status from the broadcast, and notifying a callback interface to return the corresponding installation result to the mobile management application based on the application installation status; saving, by the mobile management application, the received installation result.

6. The method according to claim 1, wherein the initiating the new version of the mobile management application and the initiating the old version of the mobile management application comprises:

step S51: starting, by the application providing the system interface, a main service of the mobile management application through the installation service for the mobile management application that has been started, setting an operation parameter passed in from starting the main service of the mobile management application as updating the mobile management application, and saving an installation result of updating the mobile management application; wherein the main service of the mobile management application inherits service components of the operating standard;

step S52: judging, by the mobile management application, whether a current running process is a main process of the mobile management application; if so, initializing the mobile management application; otherwise, stopping;

step S53: checking, by the main service of the mobile management application, whether the operation parameter passed in from the starting the main service of the mobile management application is the updating the mobile management application; if so, obtaining the saved installation result and judging whether the mobile management application has been successfully updated based on the installation result; if so, executing step S54; otherwise, stopping;

step S54: checking, by the mobile management application, whether an installation task record for the mobile management application exists in an application push task database; if so, updating a push status of a mobile management application update task in the application push task database based on the installation result; otherwise, stopping.

7. The method according to claim 6, wherein the initializing the mobile management application comprises: initializing the application push task database, initializing a component for downloading a file, and initializing a third broadcast receiver.

8. The method according to claim 7, wherein the initializing the third broadcast receiver comprises: listening to the broadcast of a system network connection change, and initializing a push environment.

9. The method according to claim 8, wherein the initializing the push environment specifically comprises: executing an operation for initializing the push environment when a device network is detected to be changed, starting the backend server, and connecting to the backend server; when the backend server is successfully connected to, starting a database connecting service, checking statuses of various push tasks of the mobile management application, and reporting to the backend server.

10. The method according to claim 1, wherein after the mobile management application is initiated, the method further comprises: performing, by the mobile management application, a self-inspection, which comprises:
- step B1: checking the application push task database after the mobile management application has been initiated, judging whether an unfinished application push task exists; if so, executing step B2; otherwise, stopping;
- step B2: judging, by the mobile management application, whether a current installation task is in an end state; if so, executing step B3; otherwise, executing step B4;
- step B3: reporting, by the mobile management application, application installation end information to the backend server, deleting an installation record of the mobile management application, deleting the mobile management application update package, and stopping;
- step B4: judging, by the mobile management application, whether the current installation task is in a downloading state; if so, continuing to download the application; otherwise, executing step B5;
- step B5: judging, by the mobile management application, whether the current installation task status is being currently installed or has been installed; if so, executing step B6; otherwise, stopping;
- step B6: judging, by the mobile management application, whether the current installation task is updating the mobile management application; if so, executing step B7; otherwise, waiting for the application to be downloaded;
- step B7: judging, by the mobile management application, whether the successful update file for the mobile management application exists; if so, reporting successful update information to the backend server, deleting the mobile management application update package and the update record of the mobile management application in the application push task database, and stopping; otherwise, executing step B8;
- step B8: judging, by the mobile management application, whether a failed update file for the mobile management application exists; if so, reporting failed update information to the backend server, deleting the mobile management application update package and the update record of the mobile management application in the application push task database, and stopping; otherwise, waiting for the application to be downloaded.

11. The method according to claim 10, before the step B1, further comprising: initiating, by the backend server, a push task and sending a to-be-pushed list to the mobile management application; receiving, by the mobile management application, the to-be-pushed list and saving the to-be-pushed list in a data table of the application push task database.

12. The method according to claim 10, wherein the judging whether an unfinished application push task exists in the step B1 comprises: traversing all status words in the data table of the application push task database; if all of the status words are have been pushed, no unfinished application push task exists; otherwise an unfinished application push task exists.

13. The method according to claim 1, before the step S1, further comprising:
- step T1: receiving, by the mobile management application, an application installation package pushed by the backend server;
- step T2: judging, by the mobile management application, whether a download condition is met; if so, executing step T3; otherwise, reporting an error and stopping;
- step T3: adding, by the mobile management application, an application downloading task to an application push task database;
- step T4: starting, by the mobile management application, downloading the application; and if the application is successfully downloaded, executing step T5;
- step T5: judging, by the mobile management application, whether a currently to-be-installed application that has been successfully downloaded meets an installation condition; if so, executing step T6;
- step T6: judging, by the mobile management application, whether the currently to-be-installed application is the mobile management application; if so, broadcasting and notifying, by the mobile management application, the application providing the system interface to update the mobile management application; otherwise, executing step T7;
- step T7: judging, by the mobile management application, whether other to-be-installed applications that have been successfully downloaded exist in the application push task database; if so, executing step T8; otherwise, stopping;
- step T8: silently installing, by the mobile management application, other applications; if the applications are successfully installed, updating an installed application list, reporting application successful installation information to the backend server, deleting the application installation package that has been successfully installed, and executing step T9;
- step T9: judging, by the mobile management application, whether an application waiting to be downloaded exists in the application push task database; if so, obtaining an application waiting to be downloaded and returning to step T4; otherwise, stopping.

14. The method according to claim 13, wherein the step T2 comprises:
- step T21: judging, by the mobile management application, whether an application installation package name is empty; if so, reporting an error and stopping; otherwise, executing step T22;

step T22: judging, by the mobile management application, whether an application version number in the application installation package is higher than an application version number of a corresponding application that has been installed; if so, executing step T23; otherwise, reporting an error and stopping;

step T23: querying, by the mobile management application, the application push task database, and judging whether an amount of application installation tasks in the application push task database is within a preset range; if so, executing step T26; otherwise, executing step T24;

step T24: judging, by the mobile management application, whether the amount of application installation tasks in the application push task database is equal to the first preset value; if so, reporting an error and stopping; otherwise, executing T25;

step T25: deleting, by the mobile management application, all of the application installation packages that have been downloaded in the application push task database, and stopping;

step T26: judging, by the mobile management application, whether the mobile management application exists in the applications being currently installed; if so, reporting an error and stopping; otherwise, executing T3.

15. The method according to claim 13, wherein the step T4 comprises:
    step T41: downloading, by the mobile management application, the application installation package and saving the application installation package in a preset path, judging whether the application installation package has been downloaded; if so, executing step T5; otherwise, executing step T42;
    step T42: continuing, by the mobile management application, to download the application installation package and judging whether the application installation package is successfully downloaded; if so, executing step T5; otherwise, executing step T43;
    step T43: judging, by the mobile management application, whether a timeout exists when downloading the application installation package; if so, returning to step T41; otherwise, executing step T44;
    step T44: judging, by the mobile management application, whether a download process has been interrupted; if so, returning to step T41; otherwise, executing step T45;
    step T45: judging, by the mobile management application, whether an internal server error occurs during the download process; if so, reporting an error and stopping; otherwise, returning to step T41.

16. The method according to claim 13, wherein the step T5 comprises: judging, by the mobile management application, whether an application version number in the application installation package is higher than the application version number of the corresponding applicationthat has been installed; if so, executing step T6; otherwise stopping.

17. The method according to claim 13, wherein the silently installing, by the mobile management application, other applications in the step T8 comprises:
    step T81: calling, by the mobile management application, a silent installation interface and judging whether the application installation package exists based on an installation package path parameter of the silent installation interface; if so, executing step T82; otherwise, reporting an error and stopping;
    step T82: parsing, by the mobile management application, the application installation package name from the application installation package and judging whether the application installation package name is empty; if so, reporting an error and stopping; otherwise, executing step T83;
    step T83: obtaining, by the mobile management application, the first object and creating the second object, setting the installation session mode of the second object, and setting a size of the second object to a size of the application installation package;
    step T84: taking, by the mobile management application, the second object as the parameter, creating an installation session based on the first object, and obtaining a corresponding installation session identifier;
    step T85: judging, by the mobile management application, a value of the installation session identifier; if the value of the installation session identifier is the first preset value, reporting an error and stopping; otherwise, executing step T86;
    step T86: copying, by the mobile management application, the application installation package to the specified directory based on the first object, the installation session identifier and an installation package path, and judging whether he application installation package has been successfully copied; if so, executing step T87; otherwise, reporting an error and stopping;
    step T87: installing, by the mobile management application, the application based on the first object, the installation session identifier, the installation package path and the first broadcast receiver.

18. A smart Point of Sale device, wherein the smart Point of Sale device comprises at least one processor, a memory and instructions stored on the memory and executable by the at least one processor, the at least one processor executes the instructions to implement the following steps:
    step S1: judging whether a mobile management application update package path in a broadcast for updating a mobile management application is empty when receiving the broadcast; if the mobile management application update package path is not empty, executing step S2;
    step S2: starting an installation service for the mobile management application, silently installing a new version of the mobile management application based on a saved mobile management application update package, and judging whether the new version of the mobile management application has been successfully installed, if so, executing step S3; otherwise, executing step S4; wherein when the new version of the mobile management application is silently installed, a running old version of the mobile management application is killed by an operating system;
    step S3: changing a mobile management application update package as a successful update file for the mobile management application, and initiating the new version of the mobile management application;
    step S4: changing the mobile management application update package as a failed update file for the mobile management application, and initiating the old version of the mobile management application;
    the silently installing the new version of the mobile management application based on the saved mobile management application update package comprises:
    step S21: calling an encapsulated silent installation interface, and judging whether the mobile management application update package exists based on the mobile management application update package path; if the mobile management application update package exists, executing step S22;

step S22: parsing a mobile management application update package name from the mobile management application update package, and judging whether the mobile management application update package name is empty; if the mobile management application update package name is not empty, executing step S23;

step S23: obtaining a first object and creating a second object, setting an installation session mode of the second object, and setting a size of the second object to be a size of the mobile management application update package;

step S24: creating an installation session for the mobile management application based on the first object and the second object, and obtaining a corresponding installation session identifier;

step S25: judging a value of the installation session identifier; and if the value of the installation session identifier is not a first preset value, executing step S26;

step S26: copying the mobile management application update package to a specified directory based on the first object, the installation session identifier and the mobile management application update package path, and judging whether the replication is successful; if the replication is successful, executing step S27;

step S27: installing the mobile management application based on the first object, the installation session identifier, the mobile management application update package path and a first broadcast receiver; if an error occurs during an installation process, reporting an error and stopping; otherwise, judging whether the new version of the mobile management application has been successfully installed.

19. The smart Point of Sale device according to claim 18, wherein the at least one processor executes the instructions to implement the following steps:

step A1: registering to listen to, by the application providing the system interface, a second broadcast receiver of the broadcast for updating the mobile management application.

20. A non-transitory computer-readable storage medium, wherein the computer-readable storage medium comprises a computer program which, when running on a smart Point of Sale device, enables the smart Point of Sale device to perform the following steps:

step S1: judging whether a mobile management application update package path in a broadcast for updating a mobile management application is empty when receiving the broadcast; if the mobile management application update package path is not empty, executing step S2;

step S2: starting an installation service for the mobile management application, silently installing a new version of the mobile management application based on a saved mobile management application update package, and judging whether the new version of the mobile management application has been successfully installed, if so, executing step S3; otherwise, executing step S4; wherein when the new version of the mobile management application is silently installed, a running old version of the mobile management application is killed by an operating system;

step S3: changing a mobile management application update package as a successful update file for the mobile management application, and initiating the new version of the mobile management application;

step S4: changing the mobile management application update package as a failed update file for the mobile management application, and initiating the old version of the mobile management application;

the silently installing the new version of the mobile management application based on the saved mobile management application update package comprises:

step S21: calling an encapsulated silent installation interface, and judging whether the mobile management application update package exists based on the mobile management application update package path; if the mobile management application update package exists, executing step S22;

step S22: parsing a mobile management application update package name from the mobile management application update package, and judging whether the mobile management application update package name is empty; if the mobile management application update package name is not empty, executing step S23;

step S23: obtaining a first object and creating a second object, setting an installation session mode of the second object, and setting a size of the second object to be a size of the mobile management application update package;

step S24: creating an installation session for the mobile management application based on the first object and the second object, and obtaining a corresponding installation session identifier;

step S25: judging a value of the installation session identifier; and if the value of the installation session identifier is not a first preset value, executing step S26;

step S26: copying the mobile management application update package to a specified directory based on the first object, the installation session identifier and the mobile management application update package path, and judging whether the replication is successful; if the replication is successful, executing step S27;

step S27: installing the mobile management application based on the first object, the installation session identifier, the mobile management application update package path and a first broadcast receiver; if an error occurs during an installation process, reporting an error and stopping; otherwise, judging whether the new version of the mobile management application has been successfully installed.

* * * * *